United States Patent [19]

Kiyomoto et al.

[11] Patent Number: 5,768,026
[45] Date of Patent: Jun. 16, 1998

[54] DICHROIC MIRROR FOR SEPARATING/ SYNTHESIZING LIGHT WITH A PLURALITY OF WAVELENGTHS AND OPTICAL APPARATUS AND DETECTING METHOD USING THE SAME

[75] Inventors: Hironobu Kiyomoto, Kyoto; Kouichi Ekawa, Osaka; Hayami Hosokawa, Koyto, all of Japan

[73] Assignee: Omron Corporation, Kyoto, Japan

[21] Appl. No.: 919,151

[22] Filed: Aug. 28, 1997

Related U.S. Application Data

[63] Continuation of Ser. No. 746,191, Nov. 6, 1996, abandoned, which is a continuation of Ser. No. 420,594, Apr. 12, 1995, Pat. No. 5,600,487.

[30] Foreign Application Priority Data

Apr. 14, 1994 [JP] Japan ................ 6-102124
Apr. 14, 1994 [JP] Japan ................ 6-102126

[51] Int. Cl.$^6$ ................ G02B 27/14; G02B 1/10
[52] U.S. Cl. ................ 359/634; 359/586
[58] Field of Search ................ 359/634, 586, 359/587, 359, 629

[56] References Cited

U.S. PATENT DOCUMENTS

| | | | |
|---|---|---|---|
| H1182 | 5/1993 | Spry | 359/320 |
| 3,649,359 | 3/1972 | Apfel | 359/587 |
| 3,981,568 | 9/1976 | Bartolomei | 359/587 |
| 4,009,453 | 2/1977 | Mahlein | 372/99 |
| 4,047,805 | 9/1977 | Sekimura | 359/586 |
| 4,132,959 | 1/1979 | Bouwhis | 331/94.5 |
| 4,309,075 | 1/1982 | Apfel | 359/586 |
| 4,320,936 | 3/1982 | Sawamura | 359/359 |
| 5,035,485 | 7/1991 | Kageyama | 359/586 |
| 5,126,880 | 6/1992 | Wheatley | 359/587 |
| 5,278,680 | 1/1994 | Karasawa | 359/63 |
| 5,337,191 | 8/1994 | Austin | 359/885 |
| 5,371,627 | 12/1994 | Mitsutake | 359/67 |
| 5,460,888 | 10/1995 | Hashimoto | 428/432 |
| 5,532,871 | 7/1996 | Hashimoto | 359/359 |

FOREIGN PATENT DOCUMENTS

| | | | |
|---|---|---|---|
| 6-138317 | 5/1994 | Japan | 359/586 |

*Primary Examiner*—Georgia Y. Epps
*Assistant Examiner*—Ricky Mack
*Attorney, Agent, or Firm*—Dickstein Shapiro Morin & Oshinsky LLP

[57] ABSTRACT

A dichroic mirror of the present invention having a first portion including an H material layer having a high refractive index, and an M material layer having an intermediate refractive index, the H material layer and the M material layer being laminated repeatedly; and a second portion including an H material layer having a high refractive index, and an L material layer having a low refractive index, the H material layer and the L material layer being laminated repeatedly. An optical apparatus and detecting method of the present invention use the above dichroic mirror.

21 Claims, 22 Drawing Sheets

| |
|---|
| 0.450H |
| 1.053L |
| 1.010H |
| (1H,1L)8 |
| 0.854H |
| 0.956L |
| 0.403H |
| SUBSTRATE |

| 1.62L |
|---|
| 0.97H |
| (1.15H, 1.06M)5 |
| 0.92L |
| 1.20H |
| 0.55L |
| 1.09H |
| SUBSTRATE |

DICHROIC MIRROR FOR SEPARATING/ SYNTHESIZING LIGHT WITH A PLURALITY OF WAVELENGTHS AND OPTICAL APPARATUS AND DETECTING METHOD USING THE SAME

This application is a continuation, of application No. 08/746,191 filed Nov. 6, 1996, now abandoned, which is a continuation of application No. 08/420,594, filed Apr. 22, 1995, now U.S. Pat. No. 5,600,487.

BACKGROUND OF THE INVENTION

1. Field of he Invention

The present invention relates to a dichroic mirror for separating or synthesizing light having a plurality of wavelengths which is comprised of a multilayered film, and optical apparatus and detecting method using the dichroic mirror.

2. Description of the Related Art

Conventionally, an apparatus shown in FIG. 1 is known as an optical apparatus for projecting or receiving light in the same direction after separating or synthesizing light having a plurality of wavelengths. This optical apparatus is arranged such that rays of light from two light sources 1a and 1b having different wavelengths (wavelengths λ1 and λ2) are converted into parallel rays of light by means of collimator lenses 2a and 2b, respectively, and the rays of light are reflected or transmitted by using a dichroic mirror 2, which is an optical element, owing to differences in the wavelength, thereby synthesizing the light. FIG. 2 shows a spectral characteristic of the dichroic mirror, and if λ1 is set in a reflected-wavelength region (e.g., 700 nm) and λ2 in a transmitted-wavelength region (e.g., 900 nm), the two light waves are synthesized by the dichroic mirror, making it possible to project the light with the two wavelengths (λ1 and λ2).

In addition, as an optical filter used in this type of optical apparatus, one having a multilayered structure, called the dichroic mirror, is conventionally known. As shown in FIG. 3B, the film of the conventional dichroic mirror is comprised of, for instance, a substrate (refractive index n=1.5)/0.40H, 0.96L, 0.94H, 0.85L, (1H, 1L)8, 1.01H, 1.05L, 0.45H/air (n=1). The dichroic mirror of this arrangement has the wavelength-transmittance characteristic such as the one shown in FIG. 3A. The aforementioned values represent optical film layer thicknesses (nd) in a case where ¼ is set to be 1 when l=750 nm, and "H" and "L" respectively represent a material layer having a high refractive index and a material layer having a low refractive index (e.g., the former being 2.26 and the latter 1.46). As examples of these material layers, it is possible to cite $TiO_2$ and $SiO_2$. In addition, (1H, 1L)8 represents a group of repeatedly laminated material layers, indicating that 1H and 1L are repeated 8 times.

With the above-described conventional optical apparatus, however, since a dichroic mirror 5 (FIG. 1) is disposed in the paths of parallel rays of light, there were problems including a decline in the economic efficiency due to the tendency toward a large-size apparatus and an increase in the number of component parts such as the collimator lenses.

In addition, as for the characteristic of the dichroic mirror serving as the optical filter, the steeper the rising characteristic shown in FIG. 3A, the light having the closer two wavelengths can be separated or synthesized. An example in which the light with two wavelengths is synthesized by the dichroic mirror is shown in FIG. 4. In this case, the characteristic required of the dichroic mirror is that, as shown in FIG. 5, the reflectance is high (the transmittance is low) at the wavelength λ1, and the transmittance is high at the wavelength λ2. In the dichroic mirror having such a characteristic, the power of the light with λ1 and the power of the light with λ2 can be synthesized efficiently into optical power after synthesis. Also, a case where the light is separated on the basis of the difference in wavelength can be considered in utterly the same way. Accordingly, the steeper the rising characteristic, the closer the reflecting region and the transmitting region in FIG. 5 are, and it is possible to separate or synthesize the light having two closer wavelengths.

As methods of obtaining a steep rising characteristic when the angle of incidence is small, it is possible to cite, among others, the following methods: (1) the difference between refractive indices of two adjacent material layers is made large (e.g., $TiO_2$ (n=2.26) and $SiO_2$ (n=1.46)), and (2) the number of repeated times for the group of repeated layers is increased. In addition, when the angle of incidence is large, in a case where the angle of incidence is 70°, as shown in FIG. 3A, the transmittance characteristic differs between P polarized light and S polarized light. Hence, in the case of light such as LED light, the light is randomly polarized light in which a P polarized component and an S polarized component are randomly mixed, and since the transmittance characteristic becomes the average of the P polarized light and the S polarized light, so that a ripple occurs in the vicinity of a 50% transmitting region. Since the characteristic of the randomly polarized light becomes an average value of the characteristic of the P polarized light and the characteristic of the S polarized light, a ripple occurs where the transmittance is in the vicinity of 50% (in terms of the wavelength, in the vicinity of 740 nm in FIG. 6). It should be noted that FIG. 6 shows the characteristic in the case where the angle of incidence of the dichroic mirror is 70° in the conventional arrangement of the film. The greater the difference in the refractive index and the greater the frequency of repetition, the more noticeable the difference between the P polarized light and the S polarized light becomes. Since a long wavelength range is required for the transmittance to rise from a low wavelength region to a high wavelength region as a result of this ripple, it becomes difficult to synthesize or separate the light having two close wavelengths.

As measures for solving the above-described problem, the following measures, among others, are conceivable: (1) an optimum frequency is selected as the frequency of repetition, and (2) the two material layers are selected such that the difference in the refractive index becomes small. With respect to the measure (2), if the difference in the refractive index is made small, although the rising characteristic, to which the group of repeated layers is related, can be improved for the above-described reason, there occurs a drawback with respect to layers (referred to as adjustment layers) other than the group of repeated layers. Namely, although a wider wavelength region between "A" and "B" (i.e., a nontransmitting band), which is shown in FIG. 3, is desired (since the wavelength spectrum characteristic is wide to a certain extent in the case of a light source such as an LED), if the difference between the refractive indices of the two material layers in the adjustment layer is made small (e.g., in the case of $TiO_2$ and $Al_2O_3$ shown in FIG. 18 which will be referred to later), the nontransmitting band becomes narrow. Hence, it becomes impossible to efficiently separate or synthesize the light having two wavelengths.

Here, a description will be given of the nontransmitting band located between "A" and "B." The nontransmitting band is similar to the reflecting band shown in FIG. 5, and is related to the light reflected by the dichroic mirror. If consideration is given to a case in which the light with the wavelength λ1 is reflected in FIGS. 4 and 5 referred to above, in the case of the conventional dichroic mirror (the angle of incidence: 45°) shown in FIG. 7, a wavelength falling between B (approx. 610 nm) to A (approx. 750 nm) can be selected as λ1. If the distance between B and A is short, the range from which the wavelength can be selected becomes the narrower. Meanwhile, if light such as that of the LED is used as a light source, the wavelength spectrum is wide to a certain extent; therefore, if the distance between B and A is short, not all the light emitted from the LED can be reflected, resulting in a power loss (not all the light other than the light having wavelengths falling between B and A is reflected, and that light is transmitted in accordance with its transmittance). Accordingly, unless the distance between B and A is wide to a certain extent, it is impossible to efficiently separate or synthesize light with two wavelengths.

SUMMARY OF THE INVENTION

It is an object of the present invention to provide a dichroic mirror for separating and synthesizing light beams having different wavelengths respectively which can be disposed in paths of nonparallel rays of light, and an optical apparatus and detecting method using the dichroic mirror.

It is another object of the present invention to provide a dichroic mirror using a plurality of different groups of laminated layers for separating and synthesizing light beams having different wavelengths respectively, as well as an optical apparatus and detecting method using the dichroic mirror.

In order to accomplish the above object of the present invention, the dichroic mirror of the present invention is comprised of a first portion including an H material layer having a high refractive index, and an M material layer having an intermediate refractive index, the H material layer and the M material layer being laminated repeatedly; and a second portion including an H material layer having a high refractive index, and an L material layer having a low refractive index, the H material layer and the L material layer being laminated repeatedly.

In order to accomplish another object of the present invention, the dichroic mirror is comprised of a first portion comprising a first material and a second material which have a first difference in a refractive index, the first and second materials being repeated with the same optical thickness, a respectively; and a second portion comprising a third material and a fourth materials which have a second difference in a refractive index, the second difference being greater than the first difference.

In the dichroic mirror in accordance with the present invention, through a combination of a repeatedly laminated portion of material layers having a small difference in the refractive index and material layers having a large difference in the refractive index, it is possible to suppress the occurrence of ripples in the transmittance characteristic and obtain a steep spectral characteristic and a wide nontransmitting-band characteristic.

In addition, in the optical apparatus having the above-described dichroic mirror or the detection method, a plurality of light beams are emitted from light-emitting elements of a light-projecting section or light sources, and one of the light beams is reflected by the dichroic mirror, and the other light beam is transmitted therethrough, thereby synthesizing the light beams and allowing the beams to be projected onto an object to be detected. As the reflected light from the object to be detected is received, it is possible to detect the presence or absence of the object to be detected, the distance thereto, a displacement and the like. Since the dichroic mirror is disposed in divergent optical paths from the light-emitting elements or the light sources, the optical system can be made compact. The dichroic mirror also acts to separate light beams having a plurality of wavelengths for receiving the light at a plurality of light-receiving sections, in which case, the dichroic mirror is disposed in convergent optical paths of the incident light, and the optical system is made compact.

BRIEF DESCRIPTION OF THE DRAWINGS

In the accompanying drawings;

FIG. 3B is a diagram illustrating an optical system of a color discriminating apparatus in accordance with a still further embodiment of the present invention;

PREFERRED EMBODIMENTS OF THE INVENTION

Figure 8:
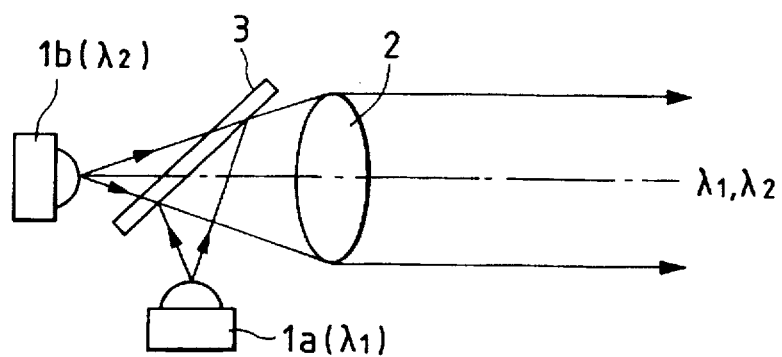
FIG. 8 is a schematic diagram of a projecting optical system of an optical apparatus in accordance with an embodiment of the present invention.

Referring now to the drawings, a description will be given of the embodiments of the present invention. FIG. 8 shows a projecting optical system of an optical apparatus in accordance with this embodiment. The optical apparatus is comprised of light sources (light-emitting elements such as light-emitting diodes) 1a and 1b for divergently emitting light with mutually different wavelengths ($\lambda 1$ and $\lambda 2$) in a nonparallel manner, respectively; a dichroic mirror 3 which is disposed in the paths of these nonparallel rays of light, is provided with wavelength selectivity, and serves as an optical element for synthesizing the light by allowing the light to be reflected thereby or transmitted therethrough in accordance with the wavelengths; and a collimator lens 2 for converting the light synthesized by the dichroic mirror 3 into parallel rays of light. The light sources 1a and 1b are arranged such that the two bundles of rays travel toward the dichroic mirror 3 from different directions as nonparallel rays, one bundle of rays being made incident upon one surface of the dichroic mirror 3 and the other bundle of rays being made incident upon the other surface of the dichroic mirror 3. Further, the two bundles of rays which travel as nonparallel rays continue to travel as nonparallel rays even after being synthesized by the dichroic mirror 3.

The following advantages can be obtained thanks to the above-described configuration. In contrast to the fact that two collimator lenses are conventionally required, one collimator lens can be shared, and the number of component parts used can be reduced, thereby making the apparatus low in cost and compact. In addition, the dichroic mirror can be made compact and low in cost, leading to a compact apparatus.

Figure 9:
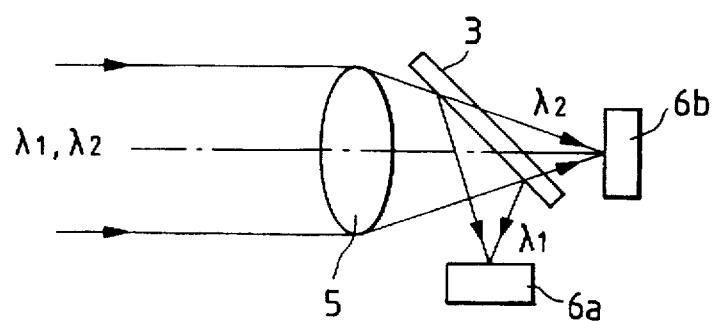
FIG. 9 is a schematic diagram of a receiving optical system in accordance with another embodiment.

Although the projecting optical system has been described above, the present invention is similarly applicable to a receiving optical system as well, as shown in FIG. 9. In FIG. 9, the apparatus of the receiving optical system is comprised of a focusing lens 5; the dichroic mirror 3 disposed in the optical path for focusing by the focusing lens 5 and adapted to separate the light into two bundles of rays having different wavelengths; and light-receiving elements 6a and 6b for receiving the separated two bundles of rays, respectively.

Figure 10:
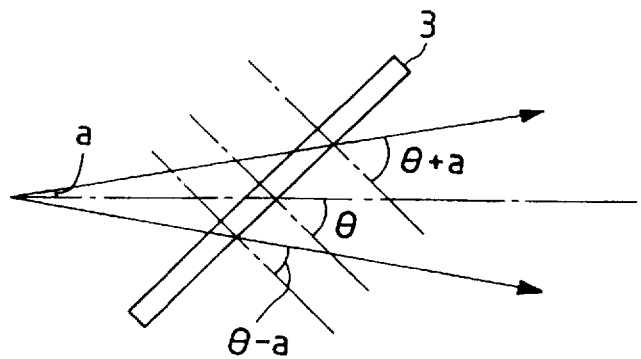
FIG. 10 is a diagram explaining the operation of an optical element in paths of nonparallel rays of light.

In accordance with the following theory established by the present inventors, it has become possible to realize the dichroic mirror disposed in the path of the nonparallel rays of light as described above. In the case where the dichroic mirror 3 is disposed in the divergent (convergent) optical path, the angle of incidence has a range from θ–a to θ+a, as shown in FIG. 10. In an optical multilayered film such as a dichroic mirror, if the angle of incidence changes by α, the amount of wavelength shift in the transmittance characteristic becomes a function of cos α. The amount of change of cos α from the central angle of incidence θ to each angle of incidence θ–a, θ+a can be respectively expressed as $$\cos\theta - \cos(\theta - a) \quad (1)$$

$$\cos\theta - \cos(\theta + a) \quad (2)$$

The amount of change of cos a in this range can be expressed as $$(1)+(2)\ (\Delta\cos\alpha)=2\cos\theta-\cos(\theta-a)-\cos(\theta+a)=2\cos\theta-2\cos\theta\cos a \quad (3)$$

From this amount, it is possible to express the deviation of the wavelength at the central angle of incidence by taking positive and negative into account. In order to convert this amount of change into an angle, this amount is considered as an amount of offset from cos θ, and we have:

$$\cos\theta-(2\cos\theta-2\cos\theta\cos a) = -\cos\theta+2\cos\theta\cos a = (2\cos a -1)\cos\theta \quad (4)$$

In other words, an angle X which is determined from $$\cos^{-1}\{(2\cos a-1)\cos\theta\} \quad (5)$$

becomes the center of the amount of the wavelength shift in the transmittance characteristic when the angle of incidence changes in the range from (θ–a) to (θ+a). In other words, it is sufficient if the dichroic mirror is designed such that the transmittance in the case of a (λ1+λ2)/2 wavelength at the angle of incidence, X, becomes ½ of a maximum transmittance.

Figures 11, 12:
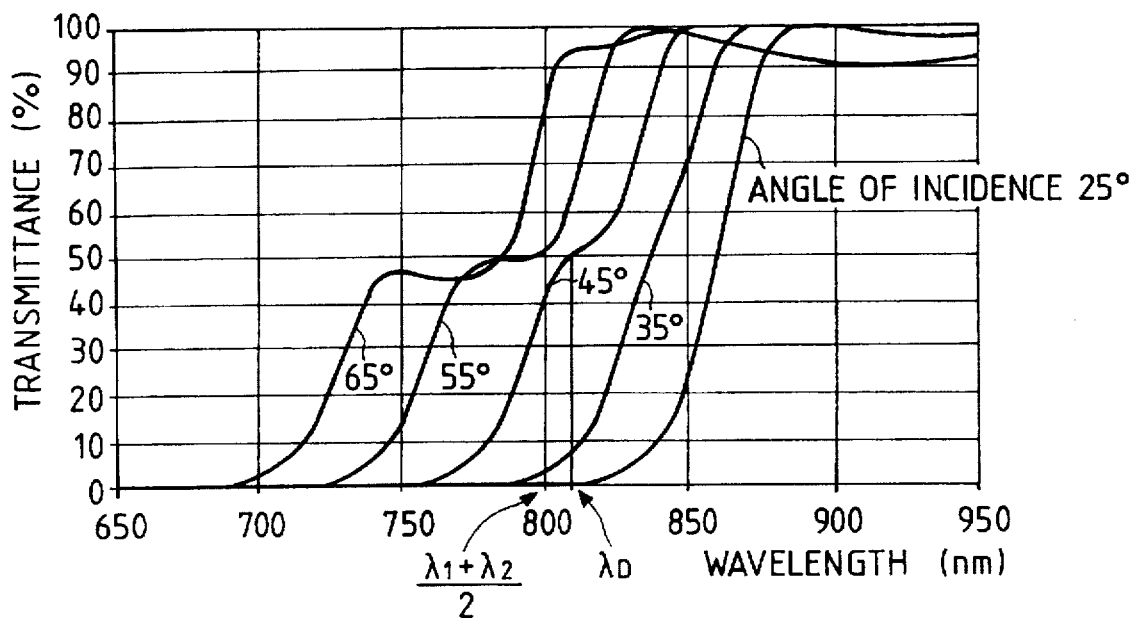
FIG. 11 is a spectral characteristic diagram explaining a design example of the optical element.
FIG. 12 is a diagram illustrating a film composition of a dichroic mirror having the above-described characteristic.

A specific example of the design of the dichroic mirror is shown below. FIG. 11 shows the transmittance characteristic of the dichroic mirror which is capable of efficiently separating or synthesizing the light with a wavelength of 700 nm and the light with a wavelength of 900 nm. As shown in FIG. 12, the film of the dichroic mirror having this characteristic is comprised of a substrate (refractive index n=1.51)/ 0.403H, 0.956L, 0.854L, (1H, 1L)B, 1.010H, 1.053L, 0.450H/air (n=1), where H is a material layer having a high refractive index, e.g., TiO$_2$ (n=2.26), L is a material layer having a low refractive index, e.g., SiO$_2$ (n=1.46), wherein the optical film thickness is such that when λ=760 nm, λ/4 is set as "1."

If it is now assumed that the central angle of incidence θ is 45°, and that the angle of divergence a is 20° when the dichroic mirror is used for the optical apparatus, the dichroic mirror itself was designed such that the wavelength at which the transmittance becomes 50% at an angle of incidence of 51.5° is set in the vicinity of (λ1+λ2)/2=800 nm, since, from Formula (5) of the above-described theory, X=cos$^{-1}$ {(2 cos a −1)cos θ} =51.5°. As a result of this design, as for the optical apparatus, a wavelength λD when the transmittance with the central angle of incidence θ(=45°) becomes virtually ½ of the maximum transmittance is (λ1+λ2)/2, and is greater than 800 nm in this example.

Figure 1:
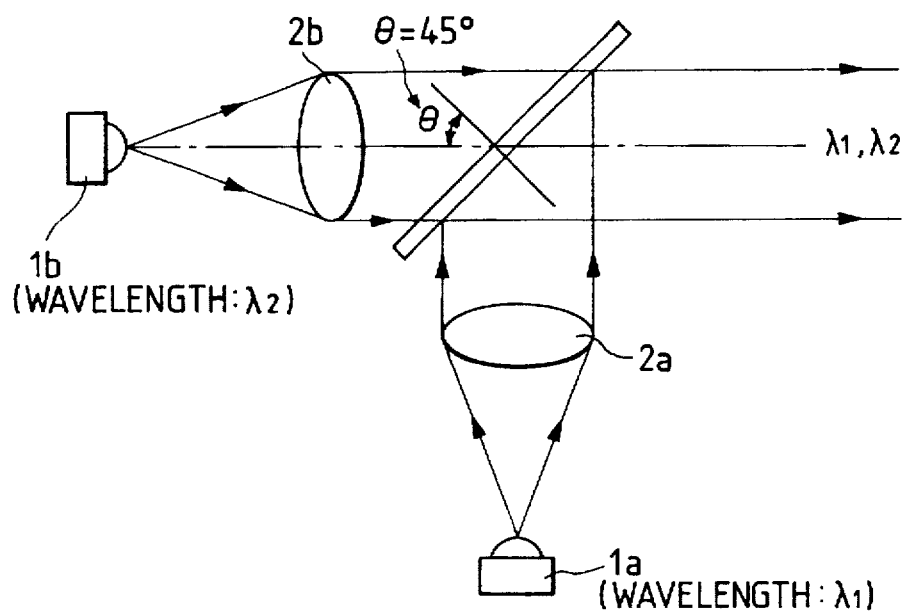
FIG. 1 is a diagram illustrating a configuration of a conventional optical apparatus.
Figure 2:
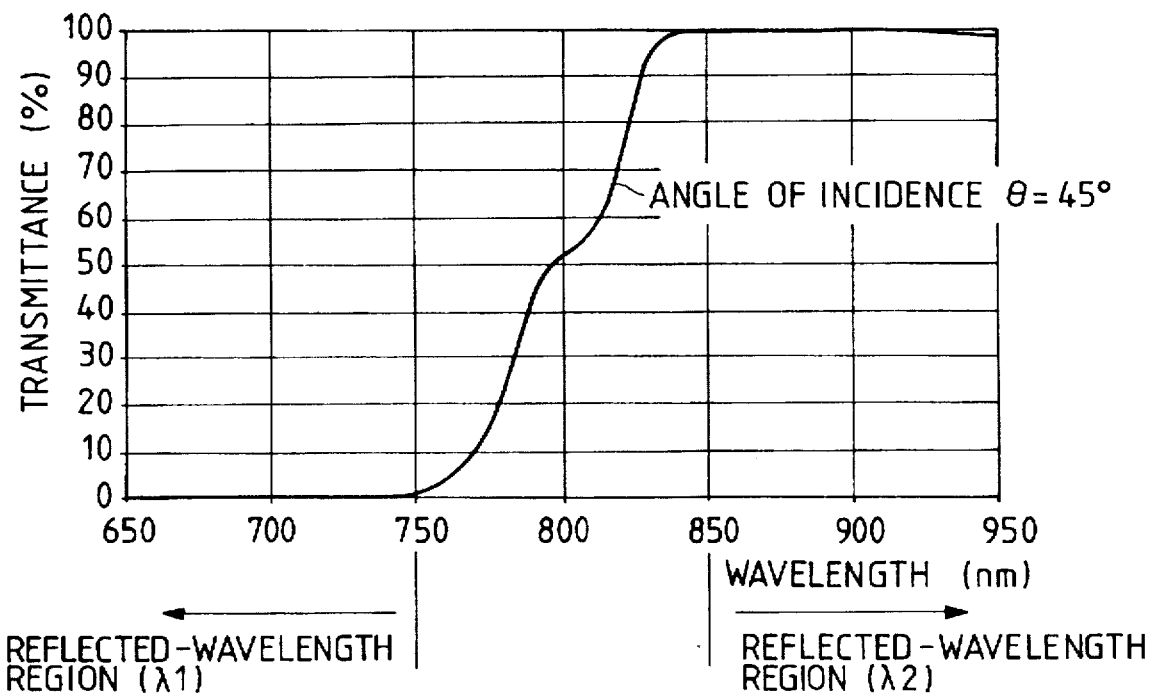
FIG. 2 is a spectral characteristic diagram of the conventional optical element.
Figure 13:
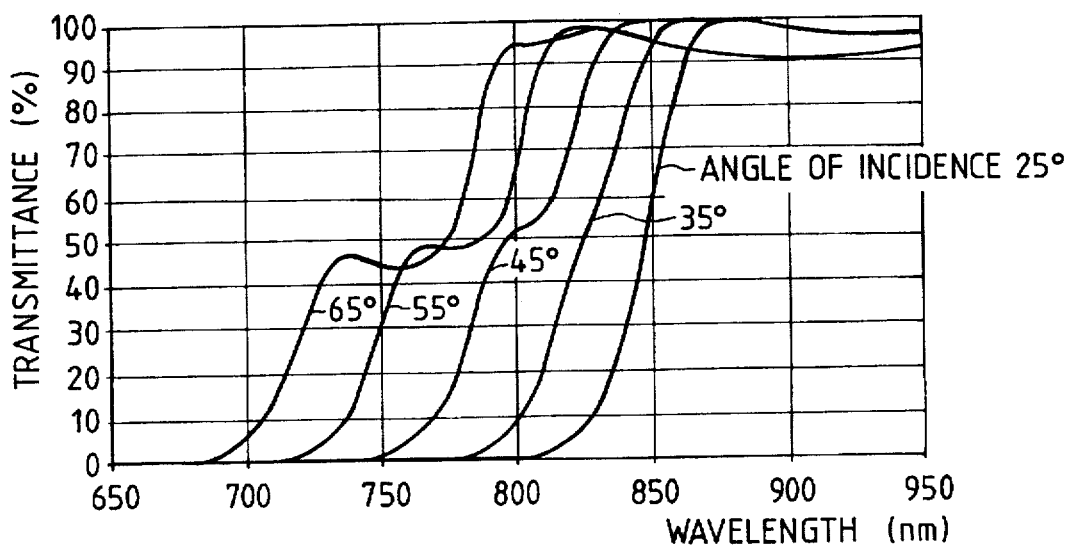
FIG. 13 is a characteristic diagram exhibiting the angle-of-incidence dependence of a conventional dichroic mirror.

Here, the angle-of-incidence dependence characteristic of the dichroic mirror in the conventional example shown in FIG. 1 is illustrated in FIG. 13. In FIG. 13, the dichroic mirror is disposed in the path of parallel rays of light (the angle of incidence: 45°), and is designed in such a manner as to be capable of efficiently separating or synthesizing the light with a wavelength of 700 nm and the light with a wavelength of 900 nm (since it is placed in the path of parallel rays of light, the angle of incidence is 45° only). In other words, at (700+900)/2=800 nm, when the angle of incidence is 45°, the transmittance is 50%. However, if such a conventional dichroic mirror is disposed in the path of nonparallel rays of light, the light with the wavelength of 700 nm at an angle of incidence of 65° cannot be reflected efficiently. In addition since the light at the angle of incidence of 65° undergoes a large change in the transmittance with respect to the wavelength in the vicinity of the wavelength of 700 nm, there is a problem in that the intensity of the reflected light changes in the case where the spectrum of the light source has undergone a wavelength shift due to a change in the temperature or the like. In contrast, in this embodiment, the light with the wavelength of 700 nm has a sufficiently small transmittance even at the angle of incidence of 65°, and does not undergo such a problem. Meanwhile, in the case of the wavelength of 900 nm, although in both the conventional example and this embodiment the transmittance becomes low when the angle of incidence is 65°, the light at the angle of incidence of 65° has a small change with respect to the wavelength in the vicinity of the wavelength of 900 nm, so that no problem is presented in both the conventional example and this embodiment.

Thus, in accordance with this embodiment, the two bundles of nonparallel rays having two close wavelengths, which could not be efficiently separated or synthesized in a conventional design, can be efficiently separated or synthesized.

In addition, at √(λ1×λ2)=√(700×900)=794 nm-in the conventional example, there is an example in which a design is made such that the transmittance becomes 50% when the angle of incidence is 45°. The concept of this conventional design will be described hereafter. In an optical multilayered film, interference of light from each boundary between layers is made use of, and the intensity of light from each boundary between layers is determined by the ratio between the thickness of each layer and the wavelength. In other words, the characteristic is determined depending on the number of times of the wavelength to which the thickness of each layer corresponds. On the other hand, in a case where the thickness of each layer is preset (if the characteristic of a designed dichroic mirror, for example, is considered), the behavior of the change of the characteristic differs between the short wavelength side and the long wavelength side with respect to a design wavelength λD. For instance, if the rate of change of the characteristic in the case of λD−Δλ and λD+Δλ (Δλ is arbitrary) is considered, since the rate of change is determined by the ratio with respect to the film thickness, the characteristic conceivably changes at a rate of λD−Δλ/λD and λD+Δλ/λD, respectively. Hence, since, in terms of the characteristic for each wavelength, the rate of change of the characteristic is determined by the relative wavelength with respect to λD, i.e., the ratio of wavelengths, the wavelength at which the change becomes equal with respect to both wavelengths when λ1 and λ2 are given can be determined from √(λ1 λ2). Thus, the concept is that it is desirable to set this wavelength as the center. If such a design is made, the aforementioned problem becomes more noticeable. In contrast, in the case of the dichroic mirror having the characteristic shown in FIG. 11 referred to above, the aforementioned problem can be alleviated substantially.

Figure 14A:
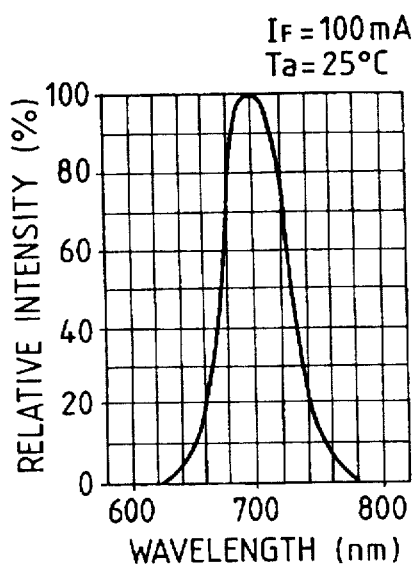
FIGS. 14A and 14B are diagrams illustrating wavelength spectra of long-wavelength light sources, respectively.
Figure 14B:
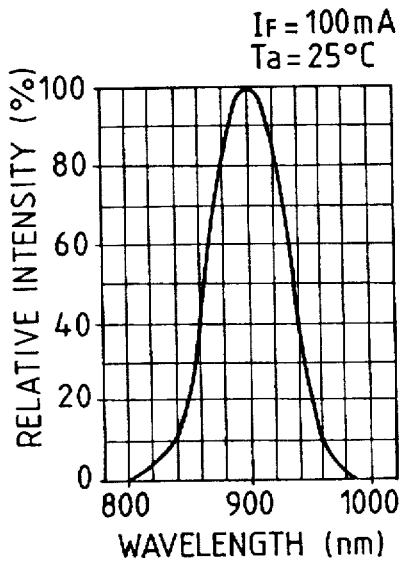

If an LED is used as the light source, the LED has a distribution of wavelengths of emitted light, such as those shown in FIGS. 14A and 14B, so that the light separation/ synthesis characteristic of the dichroic mirror having the characteristic shown in FIG. 11 or FIG. 13 is determined by taking into account the emission intensity and transmittance (reflectance) with respect to each wavelength in the distribution of the wavelengths of the emitted light. In this case as well, more efficient separation or synthesis can be attained in accordance with this embodiment than in accordance with the conventional art.

Figures 15, 16:
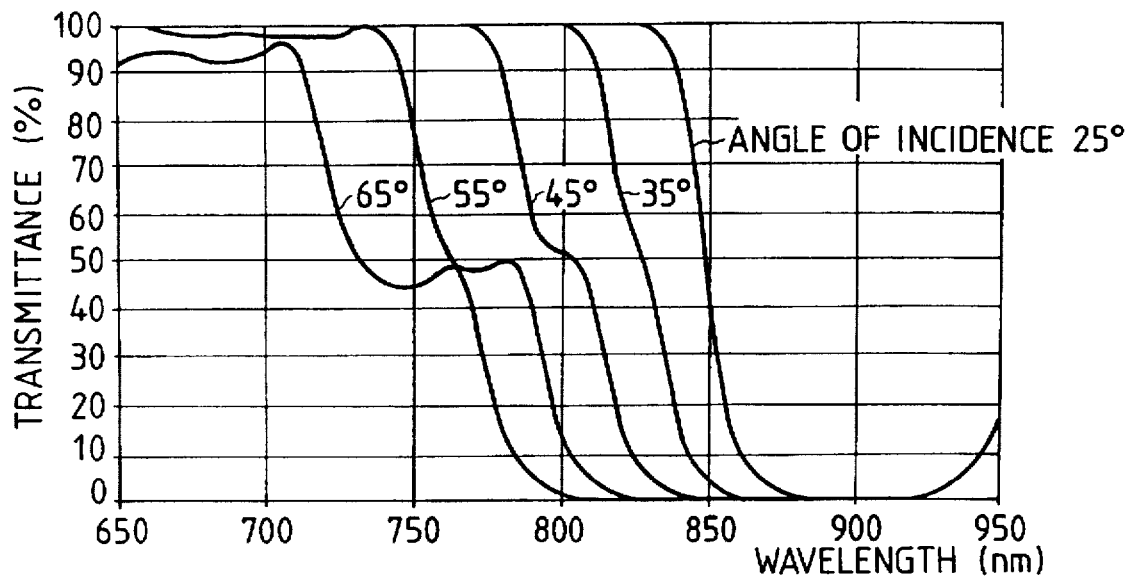
FIG. 15 is a characteristic diagram in another example of the conventional dichroic mirror.
FIG. 16 is a diagram illustrating a film composition of the dichroic mirror in accordance with an embodiment of the present invention.

Although a long-wavelength transmitting filter for reflecting the short wavelength side and transmitting the long wavelength side has been shown as the dichroic mirror in accordance with the above-described embodiment, the present invention is similarly applicable to a short-wavelength transmitting filter for transmitting the short wavelength side and reflecting the long wavelength side, as shown in FIG. 15. In addition, the phenomenon illustrated in the above-described embodiment becomes noticeable when the angle of incidence is large. Further, if the reduction of the size of the apparatus and the ease of designing the apparatus are taken into consideration, it is desirable to set the central angle of incidence in the vicinity of 45°.

Since the above-described apparatus uses both the light transmitted through the dichroic mirror and the light reflected thereby, the dichroic mirror should be preferably be one which does not suffer losses such as the absorption of the light. Accordingly, the optical multilayered film of the dichroic mirror should preferably be formed of a dielectric multilayered film which is practically free from the absorption of the light.

If the projecting optical system shown in FIG. 8 referred to above is used, it is possible to make compact an object detecting apparatus for detecting an object by receiving the light reflected by a reflecting plate and by detecting a change in the amount of the light received as the reflected light is shielded by the object being detected, as well as light-projecting sections of other photoelectric sensors. In addition, if the separation or synthesis of two wavelengths is conducted at two or more locations, it becomes possible to separate or synthesize of three or more wavelengths.

Next, a description will be given of another embodiment of the dichroic mirror in accordance with the present invention. The dichroic mirror is formed of a multilayered film and, as shown in FIG. 16, the film is comprised of:

a substrate (refractive index n=1.5)/1.09H, 0.55L, 1.20H, 0.92L (1.15H, 1.06M)5, 0.97H, 1.62L/air (n=1) . . . film composition (1)

Figure 17:
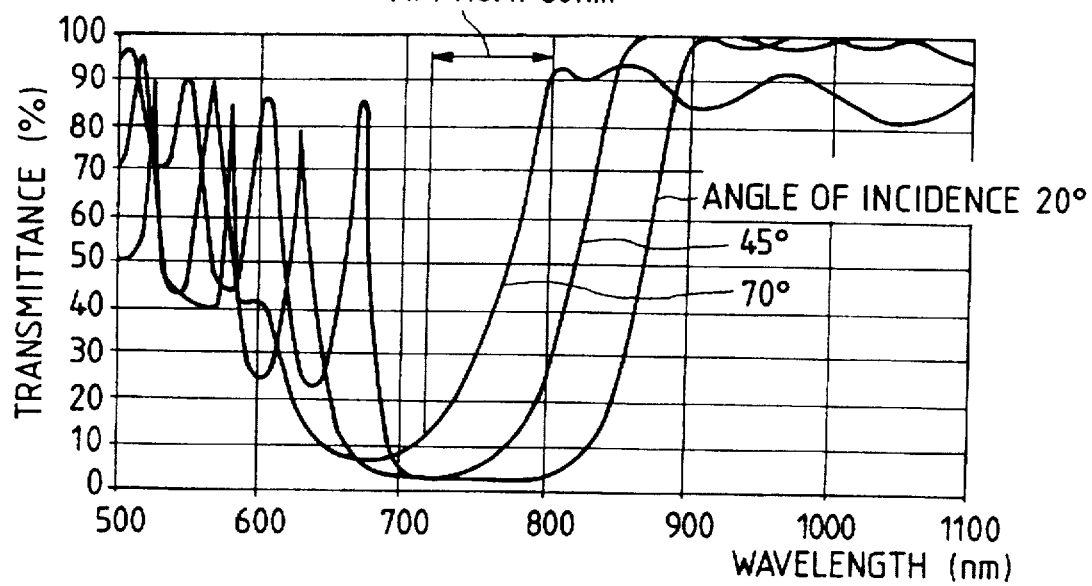
FIG. 17 is a wavelength-transmittance characteristic diagram of the dichroic mirror in accordance with the embodiment of the present invention.

The dichroic mirror of this arrangement has the wavelength-transmittance characteristic such as the one shown in FIG. 17. As for the optical film thickness, $\lambda/4$ is set to be 1 when $\lambda=720$ nm. "H," "L," and "M" represent material layers having a high refractive index, a low refractive index, and an intermediate refractive index, respectively, (e.g., 2.26, 1.46, and 1.67). As examples of these material layers, it is possible to cite $TiO_2$, $SiO_2$, and $Al_1O_3$. In this dichroic mirror, as compared to a conventional dichroic mirror, the difference in the refractive index in the group (a first portion) of repeatedly laminated layers is made smaller, and the difference in the refractive index in other adjustment layers (second portions) is made larger.

Figure 3A:
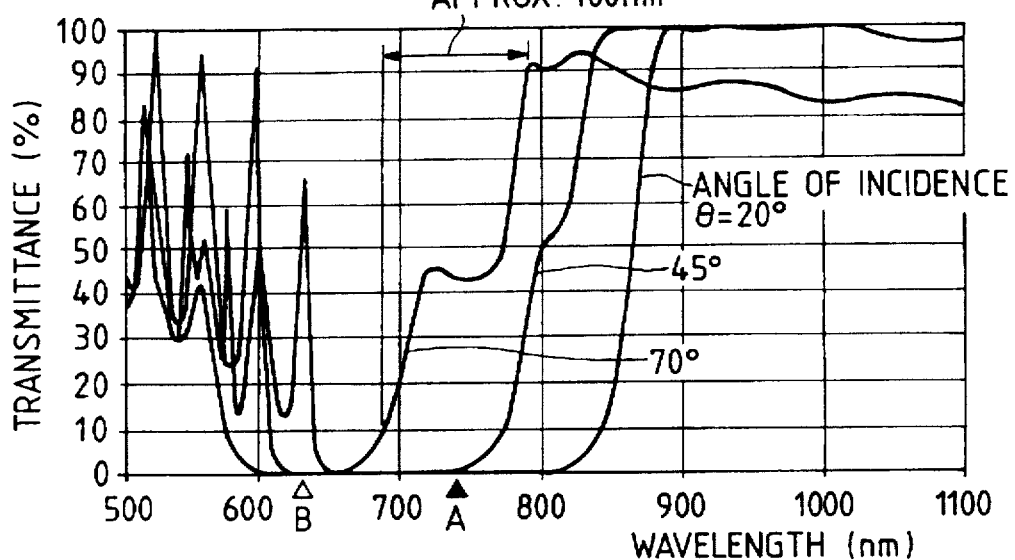
FIG. 3A is a diagram illustrating a configuration of a conventional dichroic mirror.
Figure 3B:
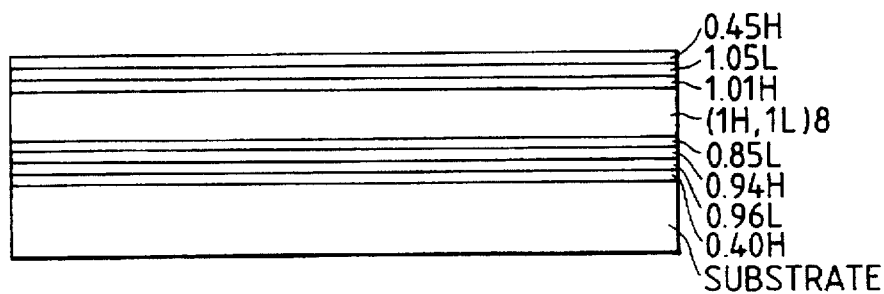
FIG. 3B is a wavelength-transmittance characteristic diagram thereof.
Figure 4:
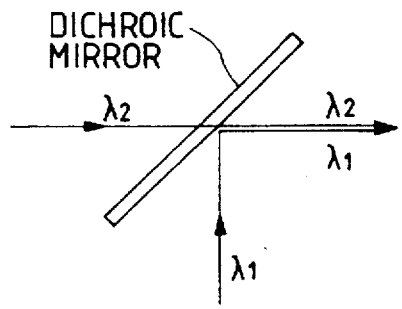
FIG. 4 is a diagram illustrating an example in which light having two wavelengths is synthesized by the dichroic mirror.
Figure 5:
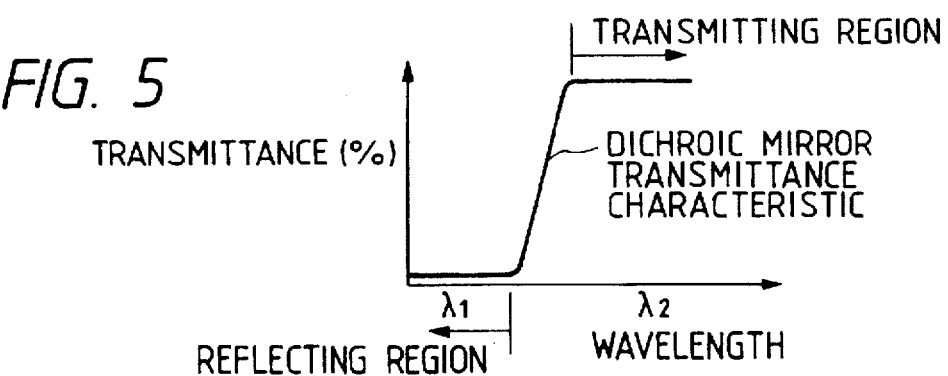
FIG. 5 is a diagram illustrating a characteristic required of the dichroic mirror.
Figure 6:
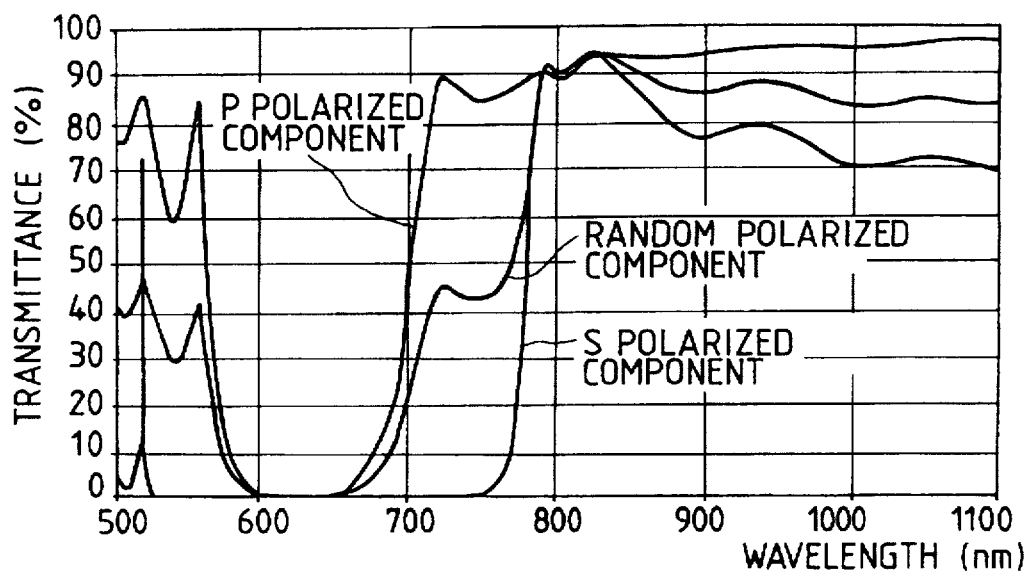
FIG. 6 is a characteristic diagram including components of P polarized light and S polarized light at an angle of incidence of 70° of the conventional dichroic mirror.
Figure 7:
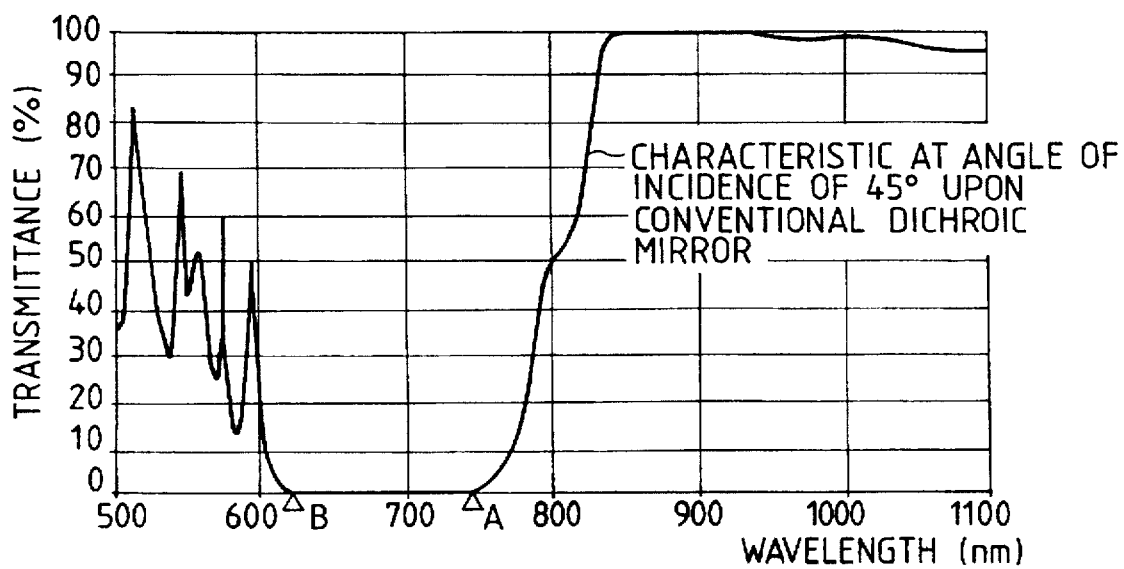
FIG. 7 is a characteristic diagram at an angle of incidence of 45° of the conventional dichroic mirror.

In accordance with this embodiment, if consideration is given to the wavelength region where the transmittance rises from 10% to 90% at the angle of incidence of 70°, the range is 100 nm in FIG. 3A referred to above, whereas the range is 80 nm in FIG. 17, so that an improvement has been made. Accordingly, it is possible to separate or synthesize the light having two closer wavelengths than in accordance with the conventional design.

Figure 18:
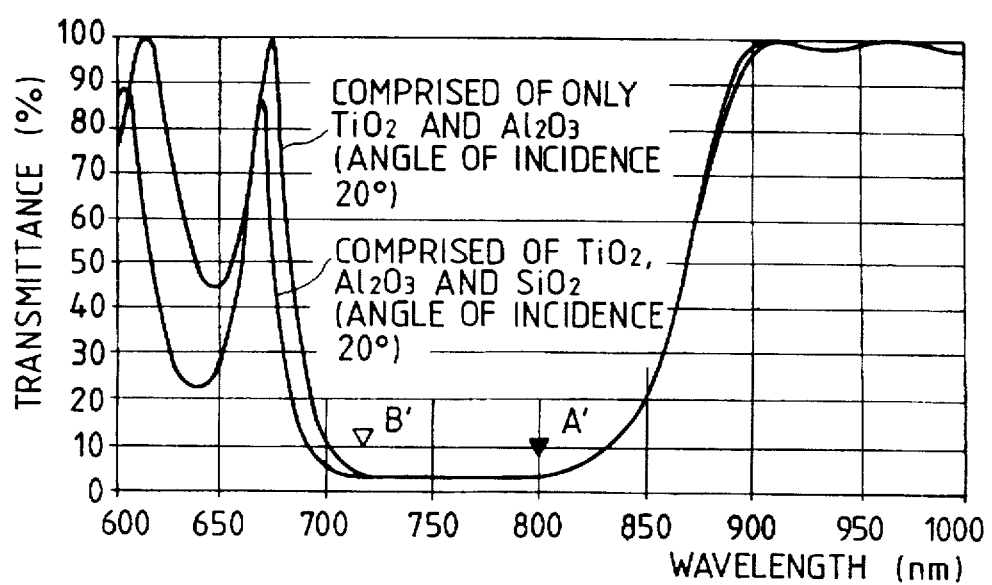
FIG. 18 is a wavelength-transmittance characteristic diagram explaining the advantage of the embodiment.

To clearly indicate the advantage of this embodiment, FIG. 18 shows, in conjunction with this embodiment, the characteristic at the angle of incidence of 20° of the dichroic mirror optimally designed by using only $TiO_2$ and $Al_2O_3$ in addition to the above case. From this drawing, it can be appreciated that the nontransmitting band (B'—A') expands in the case where the film is comprised of $TiO_2$, $Al_2O_3$, and $SiO_2$ (the adjustment layers are comprised of $TiO_2$ and $SiO_2$, while the group of repeated layers is comprised of $TiO_2$ and $Al_2O_3$) as compared to the case where the film is comprised of only $TiO_2$ and $Al_2O_3$ (the adjustment layers are also comprised of $TiO_2$ and $Al_2O_3$).

In the dichroic mirror formed of an optical multilayered film, the steepness of its characteristic is generally determined mainly by the difference in the refractive index of the group of repeated layers and the number of repeated times, and the range of the nontransmitting band is determined by the difference in the refractive index of the so-called adjustment layers. Accordingly, by causing the group of repeated layers to be comprised of $TiO_2$ and $Al_2O_3$ and the adjustment layers to be comprised of $TiO_2$ and $SiO_2$, it is possible to obtain a steeper characteristic than in the case where the film is comprised of only $TiO_2$ and $SiO_2$, and to obtain a wider nontransmitting band than in the case where the film is comprised of only $TiO_2$ and $Al_2O_3$.

In addition, although, in the composition (1) of this embodiment, the film is formed by repeating the layers of the same optical thickness, it is possible to nonuniformly design part or all of the thicknesses of the layers such that the optical thicknesses of the respective layers become optimal, instead of repeating the layers of the same optical thickness. Furthermore, as for materials, $TiO_2$ which can be easily formed into a film has been selected as a high-refractive-index material for obtaining a large difference in the refractive index in the adjustment layers, and $SiO2$ has been similarly selected as a low-refractive-index material. MgFe is conceivable as a material having a lower refractive index, but if this material is used in the multilayer, cracks and the like are liable to occur since the stress occurring at the time of film formation acts in the same direction as in the case of $TiO_2$. Also, $TiO_2$ and $Al_2O_3$ have been selected for the group of repeated layers so as to obtain an appropriate difference in the refractive index. By using the high-refractive-index material $TiO2$ for both the adjustment layers and the group of repeated layers, design and fabrication can be effected easily.

Figure 19:
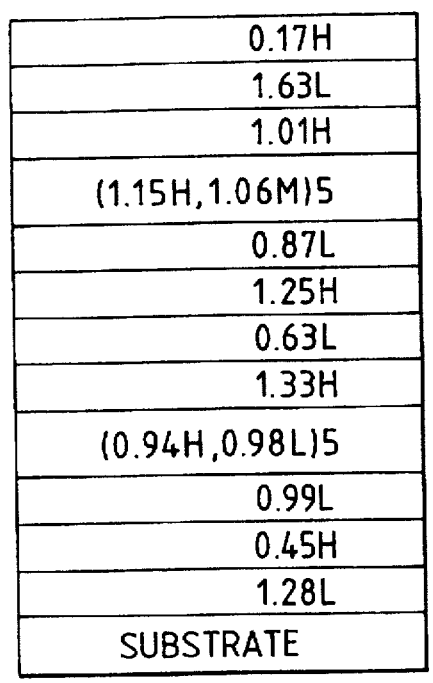
FIG. 19 is a diagram illustrating a film composition of the dichroic mirror in accordance with another embodiment.
Figure 20:
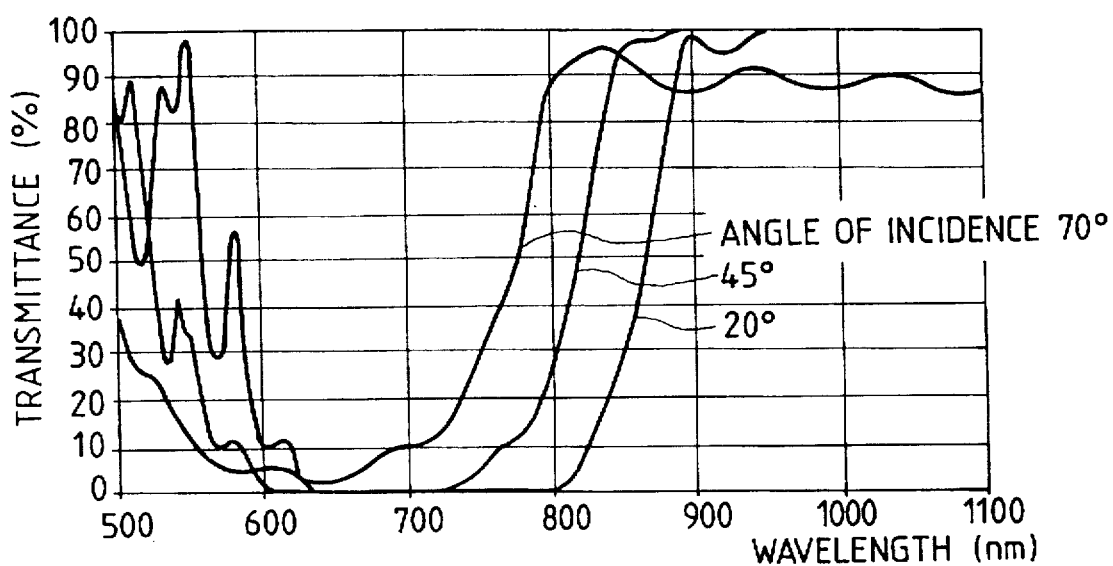
FIG. 20 is a wavelength-transmittance characteristic diagram of the dichroic mirror in accordance with the other embodiment.
Figure 21:
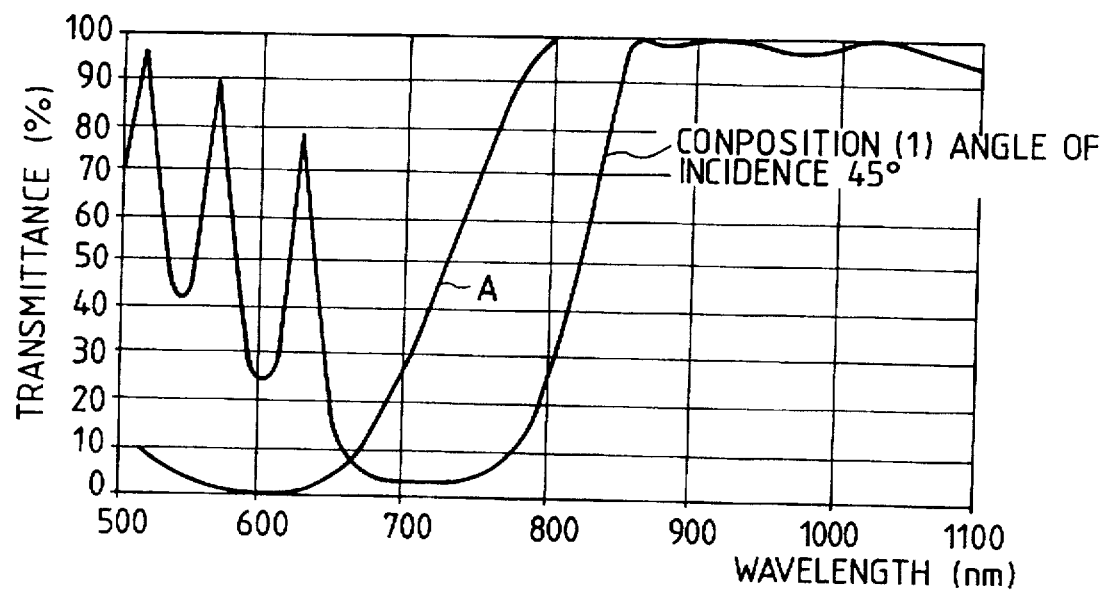
FIG. 21 is a wavelength-transmittance characteristic diagram explaining the advantage of the other embodiment.

Next, a description will be given of the configuration of the film in accordance with still another embodiment. As shown in FIG. 19, this film is comprised of a substrate (refractive index n=1.5)/1.28L, 0.45H, 0.99L, (0.94H, 0.98L)5, 1.33H, 0.63L, 1.25H, 0.87L, (1.15H, 1.06M)5, 1.01H, 1.63L, 0.17H/air (n=1) . . . film composition (2). As a result, it is possible to further expand the nontransmitting band as compared to the composition (1), as shown in FIG. 20. Here, as for the optical film thickness, $\lambda/4$ is set to be 1 when $\lambda=720$ nm in the same way as described above, and "H," "L," and "M" exhibit refractive indices of 2.26, 1.46, and 1.67, respectively, and $TiO_2$, $SiO_2$, and $Al_2O_3$ can be cited. The configuration of this embodiment was obtained as follows. FIG. 21 shows the characteristic at the angle of incidence of 45° in the composition (1). In this characteristic, the nontransmitting band with the wavelength ranging from 600 nm to 700 nm is not located in the vicinity of 0%. Accordingly, by combining the group of laminated layers having the characteristic (A) shown in FIG. 21 with the group of laminated layers in the composition (1), the nontransmitting band with the wavelength ranging from 600 nm to 700 nm can be set in the vicinity of 0%, as shown in FIG. 20. The film composition for obtaining the characteristic (A) is basically the same as the composition (1), and the design wavelength is set to be short (i.e., the optical film thickness is made thin). The film composition for obtaining the characteristic (A) may include the group of repeated layers as in the composition (1), or may be obtained by optimally designing the optical thicknesses of the respective layers, as described before.

The characteristic (A) is obtained by the "1.28L, 0.45H, ..., 1.33H, 0.63L" portion on the substrate side of the film composition, while the characteristic (1) is obtained by the "1.25H, 0.87L, ..., 1.63L, 0.17H" portion. It should be noted that, in each of these portions, the number of the adjustment layers and the optical film thickness are optimized by taking total effects into account, so that the number of layers and the optical film thickness, when considered individually for each portion, differ from those when considered totally. In this embodiment, the portion of the film for obtaining the characteristic (A) is comprised of only $TiO_2$ and $SiO_2$. This is because since the directions of the stress acting during film formation are opposite for $TiO_2$ and $SiO_2$, a multilayer can be realized easily. In addition, since the basic characteristic is obtained by the composition (1), the portion of the film concerning the characteristic (A) is comprised of $TiO_2$ and $SiO_2$ which can be formed into a multilayer relatively easily.

Incidentally, the setting and the like of the adjustment layers can be designed appropriately by adopting the technique of computer simulation or the like, and various film compositions are possible.

Thus, the dichroic mirror with a nontransmitting band displaying a steep characteristic is very effective in the case where it is disposed in paths of nonparallel rays in a projecting optical system, as shown in FIG. 8 referred to above. In addition, in a case where the angle of incidence is small, there is no difference between the transmittance characteristics of the P polarized light and the S polarized light, and in this case a steep characteristic is obtained by forming the group of repeated layers by substance layers having large refractive indices. Accordingly, the present invention is effective when the angle of incidence is large to a certain extent or more. Incidentally, in this embodiment, the central angle of incidence is set at 45° by taking the ease of use and the like into consideration. Furthermore, although a description has been given above of a long-wavelength transmitting filter, the present invention can be implemented in a similar manner as a short-wavelength transmitting filter as well.

Figure 22:
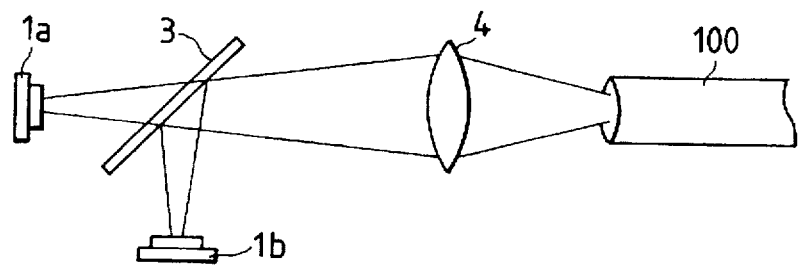
FIG. 22 is a diagram illustrating an example in which the present invention is carried out as a wavelength multiplex communication system.

FIG. 22 shows a configuration in a case where the present invention is carried out in a wavelength multiplex communication system. In this embodiment, an arrangement is provided such that after the light from the light-emitting element 1a for emitting the light with the wavelength $\lambda 1$ and the light from the light-emitting element 1b for emitting the light with the wavelength $\lambda 2$ are synthesized by the dichroic mirror 3, the light is focused by a lens 4 and is supplied to an optical fiber cable 100. If such an arrangement is provided, it becomes possible to transmit the light having a plurality of wavelengths through the optical fiber cable 100. In this case, if the light of each wavelength is modulated by desired information, the multiplexing of information can be effected easily.

Figure 23:
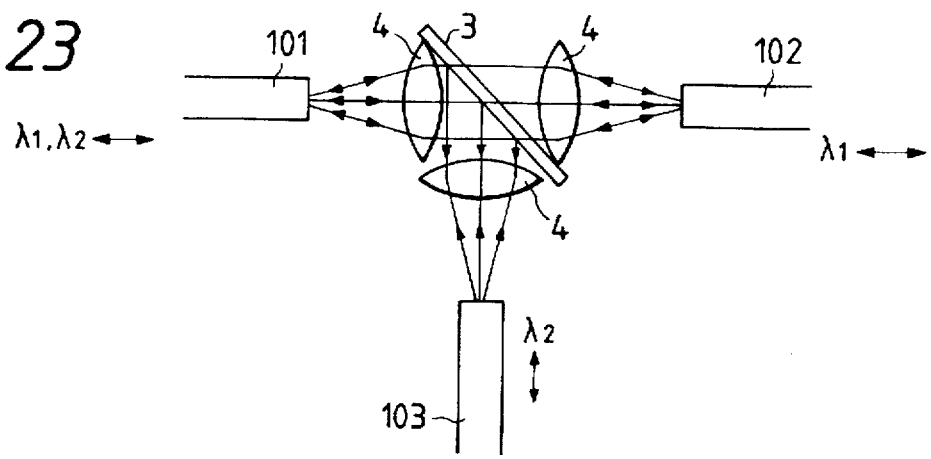
FIG. 23 is a diagram illustrating an example of the configuration of a conventional optical apparatus for effecting two-way multiplex communication.
Figure 24:
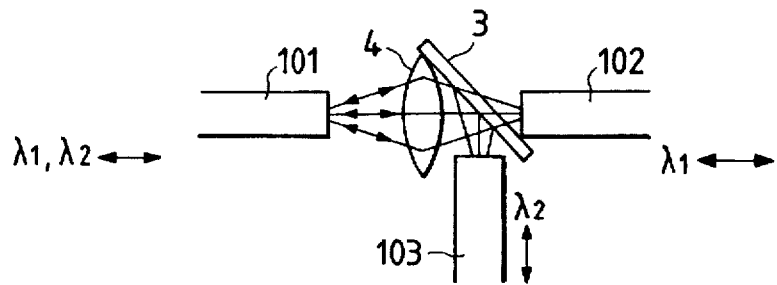
FIG. 24 is a diagram illustrating a configuration of an optical apparatus in accordance with a further embodiment of the present invention.

Further, a description will be given of another example of the optical apparatus for two-way multiplex communication by transmitting the light with a plurality of wavelengths through a channel such as an optical fiber or the like. FIG. 23 shows a configuration of a conventional optical apparatus of this type, in which three lenses 4 are disposed among an optical fiber 101 for transmitting light with wavelengths $\lambda 1$ and $\lambda 2$, an optical fiber 102 for transmitting light with the wavelength $\lambda 1$, and an optical fiber 103 for transmitting light with the $\lambda 2$, and the conventional dichroic mirror 3 (optical element) is disposed in the paths of parallel rays of light. In contrast, FIG. 24 shows a configuration of an optical apparatus in accordance with this embodiment, and since the dichroic mirror 3 in this embodiment is disposed in the paths of nonparallel rays of light, only one lens 4 is provided.

In this optical apparatus, light is emitted from an end face of the optical fiber 101 for transmitting the light with the wavelengths $\lambda 1$ and $\lambda 2$. After the light is focused by being passed through the focusing lens 4, the light is separated into the light with the wavelengths $\lambda 1$ and $\lambda 2$ by the dichroic mirror 3 in accordance with this embodiment, and is respectively guided by the optical fibers 102 and 103, and is transmitted. Meanwhile, the light with the wavelengths $\lambda 1$ and $\lambda 2$ emitted from the end faces of the optical fibers 102 and 103 is synthesized substantially coaxially by the dichroic mirror 3, and is passed through the focusing lens 4 and is guided by the optical fiber 101. For this reason, it is possible to combine into one channel a plurality of channels used for two-way communication, and to separate into each wavelength one channel conducting multiplex communication. In accordance with this embodiment, since only one lens is used, it is possible to make the apparatus compact and effect a reduction of the cost as compared with the above-described conventional configuration.

Figure 25:
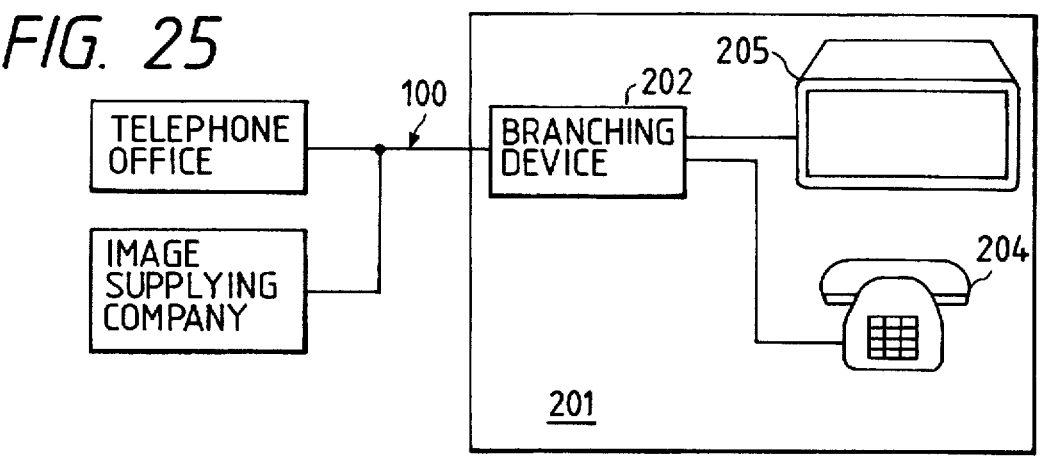
FIG. 25 is a diagram illustrating a still further embodiment.

FIG. 25 shows a configuration of a further embodiment. In this example, visual information of such as CATV or the like is multiplexed on a telephone line conducting communication using the optical fiber 100 and is transmitted, and the optical fiber 100 is branched by a branching device 202 within a home 201 to allow the visual images to be transmitted to a TV set 203 and messages on the telephone line to be transmitted to a telephone 204. In this case, since the telephone line is used for two-way communication, while the visual information is used for one-way communication, the optical apparatus using the dichroic mirror in accordance with this embodiment can be applied to the branching device 102. According to this embodiment, in contrast to the fact that three lenses are conventionally used, only one lens can be used, as described before, so that the apparatus can be made compact and low in cost.

Figure 26:
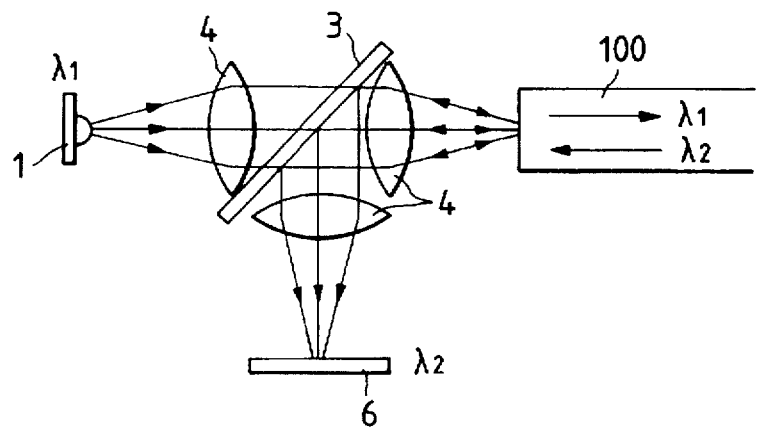
FIG. 26 is a diagram illustrating an example of the configuration of a conventional optical apparatus for effecting two-way multiplex communication.
Figure 27:
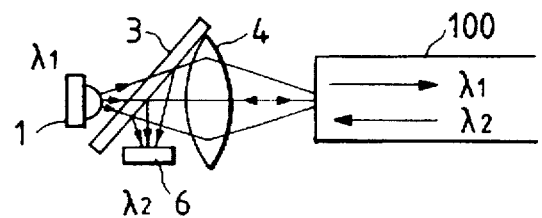
FIG. 27 is a diagram illustrating a configuration of an optical apparatus in accordance with a further embodiment of the present invention.

Furthermore, a description will be given of an optical apparatus for conducting two-way multiplex communication by transmitting the light having a plurality of wavelengths through one channel such as an optical fiber or the like. FIG. 26 shows a configuration of a conventional optical apparatus of this type which transmits the light with the wavelength $\lambda 1$ from the light-emitting element 1 through the optical fiber 100 and receives by a light-receiving element 6 the light with the $\lambda 2$ transmitted thereto through the optical fiber 100. In this case, the dichroic mirror 3 is disposed in the paths of parallel rays of light by using three lenses. In contrast, FIG. 27 shows an optical apparatus in accordance with this embodiment, which is arranged such that the dichroic mirror 3 in this embodiment is disposed in paths of nonparallel rays of light, and only one lens 4 is used. In this embodiment as well, the apparatus can be made more compact and lower in cost as compared to the conventional configuration.

Figure 28:
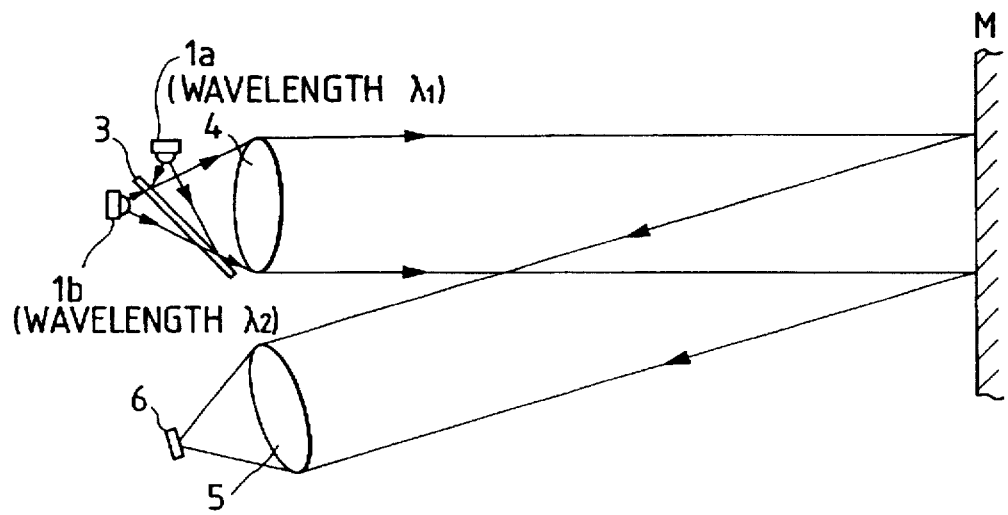
FIG. 28 is a diagram illustrating an optical system of an optical sensor apparatus in accordance with an embodiment of the present invention.

Next, a description will be given of an example in which the present invention is implemented as a reflection-type photoelectric sensor. FIG. 28 shows a configuration of the reflection-type photoelectric sensor. The light-projecting section of the sensor is comprised of the light sources 1a and 1b for respectively emitting light with mutually different wavelengths λ1 and λ2, and the dichroic mirror 3 in accordance with the present invention and the light-projecting lens 4 which are disposed in their divergent optical paths. The light-projecting section projects light through the light-projecting lens 4 toward an object M to be detected. In addition, the light-receiving section receives the light reflected from the object M to be detected by the light-receiving element 6 via the light-receiving lens 5.

Figure 29:
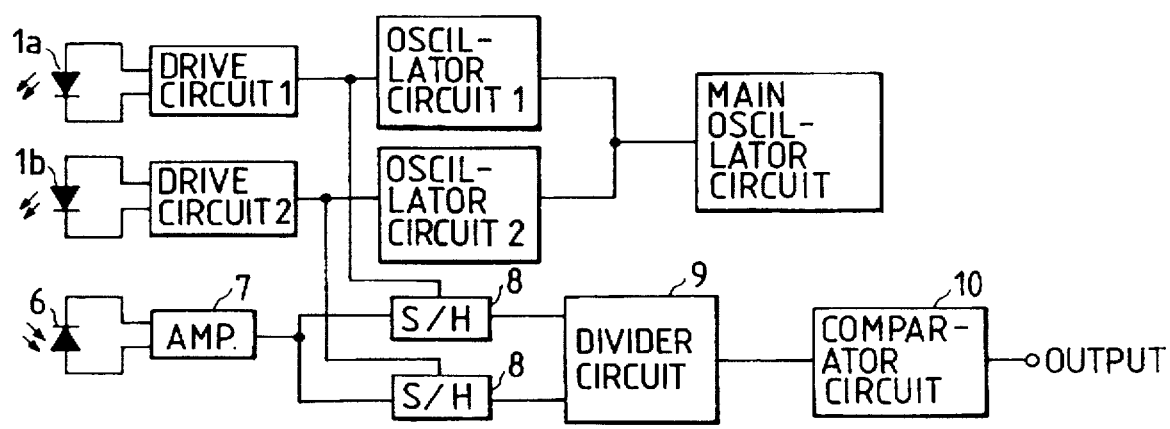
FIG. 29 is a circuit diagram of a signal processing circuit of the apparatus.

The signal processing circuit of this photoelectric sensor is shown in FIG. 29. The light sources 1a and 1b are made to emit light alternately in a time-sharing manner by the use of oscillator circuits and drive circuits. An output signal from the light-receiving element 6 is amplified by an amplifier 7, and the amount of reflected light of each wavelength is detected in synchronism with the emission of light from each light source by using a pair of sample-and-hold circuits 8. A ratio between the amount of the two reflected beams of light having different wavelengths is calculated by a divider circuit 9, and a comparator circuit 10 is used to make a comparison as to whether that value is greater than or smaller than a predetermined threshold value, so as to detect the presence or absence of an object to be detected having a particular color.

In the case where detection is carried out by means of the ratio between the amounts of two reflected beams of light having different wavelengths, as compared with an apparatus using a projected light beam of one wavelength, erroneous operation does not occur even if the absolute value of the amount of the reflected light varies, and it is possible to reliably detect the object to be detected. In other words, even if there are stains on lens portions or changes in the distance of the object to be detected, the object can be detected reliably, and even if an object with a high reflectance passes in the background of the object to be detected, erroneous detection does not occur if the color is different. To give a description in concrete terms, if a case is considered in which, in an apparatus using a projected light beam with one wavelength, the movement of a blue object, for instance, is being detected at a predetermined threshold level, there are cases where erroneous operation occurs due to an increase in the amount of reflected light when a white object passes in its background. In contrast, in the case where detection is effected by a ratio of amounts of reflected light by using two wavelengths, such as red light and infrared light, even if a white object passes in the background, the white color reflects the red light and infrared light with substantially the same ratio, so that the above-described erroneous operation does not occur.

In addition, by adopting the above-described configuration, as compared with the conventional example, it is possible to share one light-projecting lens instead of using two light-projecting lenses, and since the light-synthesizing surface of the dichroic mirror can be made small, its area can be made small, so that the cost can be reduced. Hence, the overall projecting optical system can be made compact, with the result that the apparatus can be made compact and low in cost.

Figure 30:
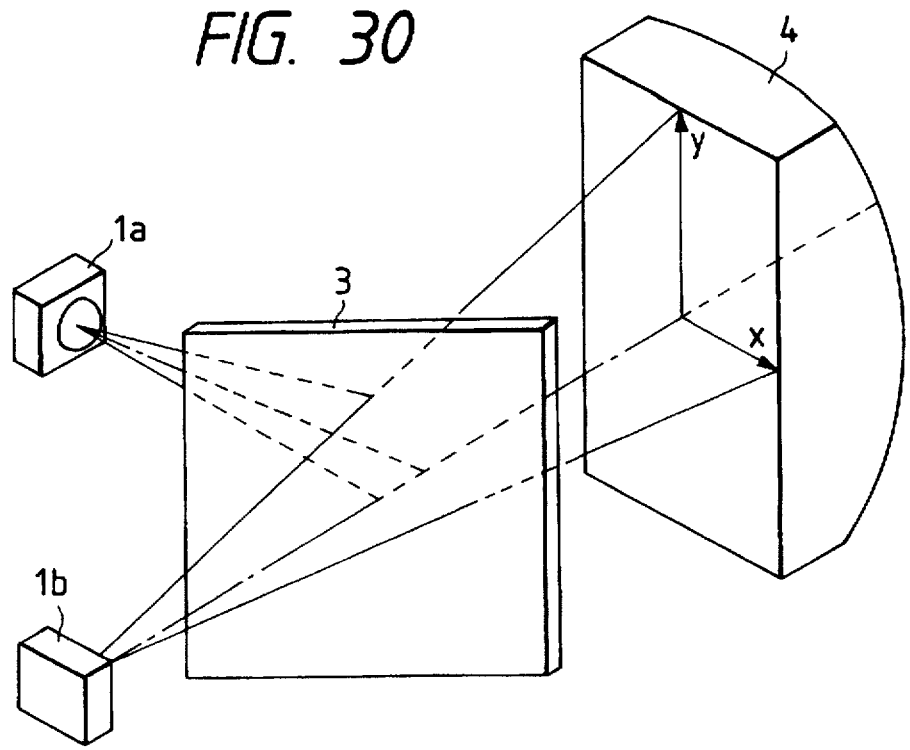
FIG. 30 is a perspective view illustrating a light-projecting section using a rectangular lens.

Moreover, a further advantage can be obtained by adopting the following configuration. As shown in FIG. 30, the light-projecting lens 4 is formed into a rectangular shape such that, when the x-axis and the y-axis (the dichroic mirror 3 is inclined with respect to the y-axis) are taken, the numerical aperture NA (NA=lens radius/focal length f) in the x-axis direction is small, and the numerical aperture in the y-axis direction is large. Even if the ranges of the angle of emergence from the light source are the same, the range of the angle of incidence upon the dichroic mirror 3 in the x-axis direction becomes wide as compared with the y-axis direction. In addition, the dichroic mirror 3 generally has angle-of-incidence dependence. Accordingly, if the numerical apertures NA in the x- and y-axis directions are the same, the distribution of intensity of the projected beam becomes asymmetrical in the x-axis direction. If the intensity distribution is asymmetrical, when, for example, a moving object is detected, there are cases where the detecting timing differs. Accordingly, by providing an arrangement in which NA in the x-direction is small and NA in the y-direction is large, the distribution of intensity of the projected beam can be made close to vertical and horizontal symmetry. Hence, it is possible to prevent a difference in the detection timing.

In addition, of the two light sources having different wavelengths, the light source having a shorter wavelength is set as the light source 1a on the side where the light is reflected by the dichroic mirror 3, and the light source having a longer wavelength is set as the light source 1b on the side where the light is transmitted by the dichroic mirror 3. As for light sources, one having a shorter wavelength generally has smaller maximum emission power, so that if the effective use of power of emission of light toward an object to be detected is considered, the light source having the shorter wavelength is desirably used on the reflecting side rather than on the transmitting side where a power loss occurs due to Fresnel reflection.

Figure 31:
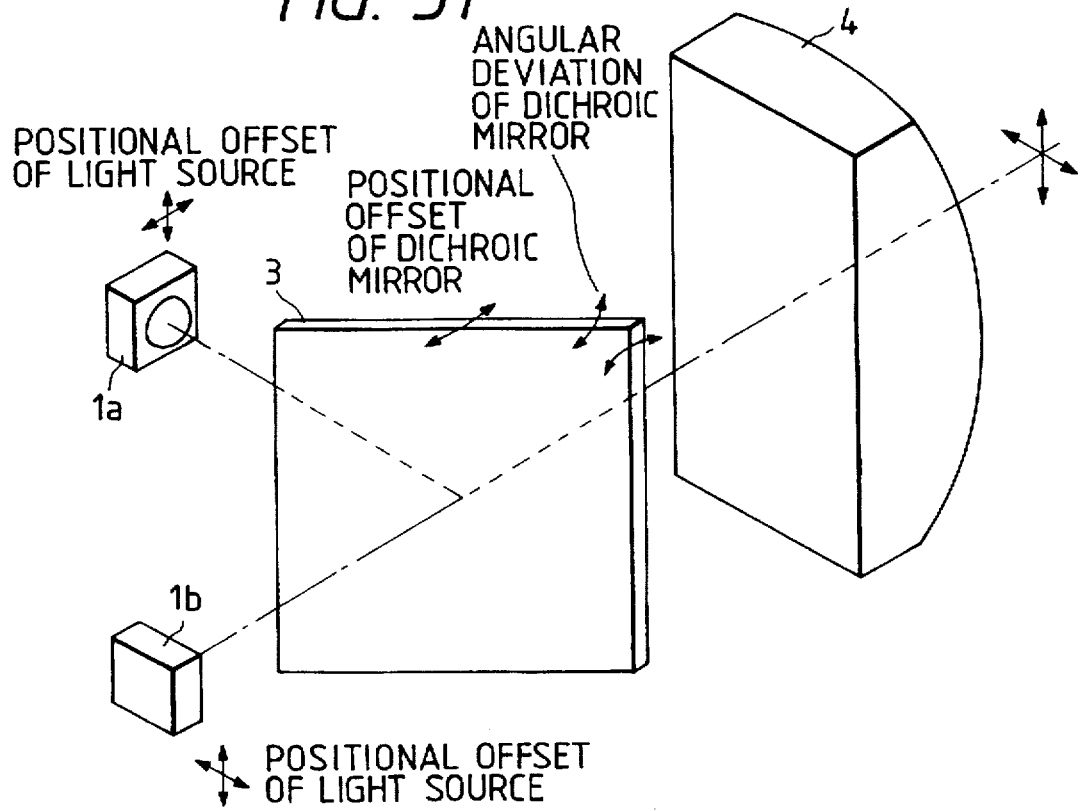
FIG. 31 is a diagram illustrating the nonalignment of projected beams.
Figure 32:
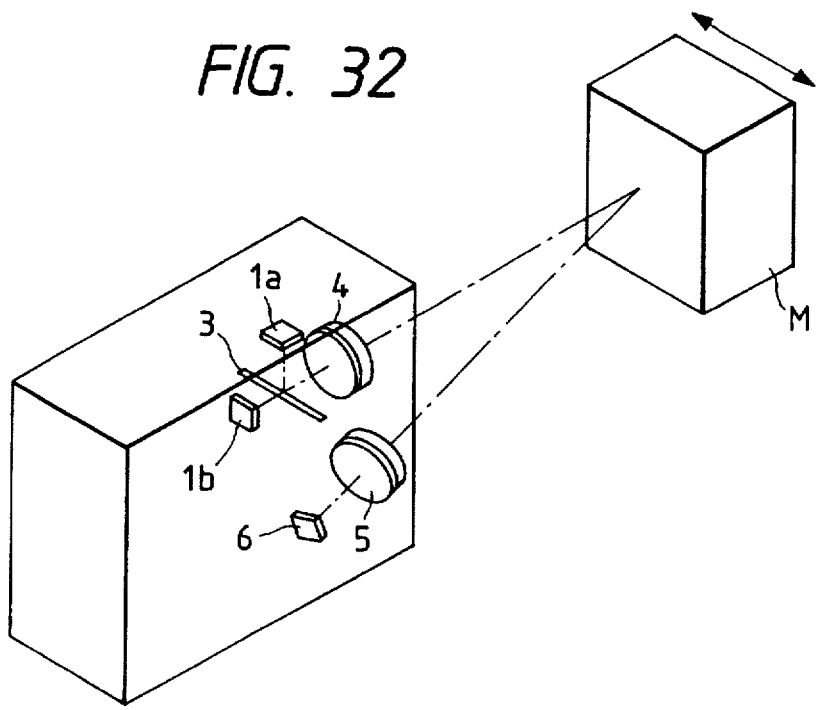
FIG. 32 is a perspective view illustrating the arrangement of an optical system.

In addition, as shown in FIG. 31, except for cases where adjustment is made by providing an adjusting mechanism, the two projected light beams are difficult to be completely aligned with each other owing to factors in fabrication such as the positional offset of the two light sources 1a and 1b and the angular deviation and positional offset of the dichroic mirror 3. Of the factors for the misalignment of the beams, the positional offset of the dichroic mirror 3 constitutes an offset only in a direction parallel to a plane where the respective optical axes extending from the two light sources 1a and 1b to the dichroic mirror 3 are present, and the other factors constitute offsets in both perpendicular and parallel directions. Therefore, the misalignment of the two projected beams becomes greater in the direction parallel to the plane where the optical axes of the light sources are present rather than in the direction perpendicular thereto. Accordingly, in a case where the object to be detected which is moving perpendicular to the direction of the projected beam is detected, if the sensor is arranged such that the plane where the axes of the light sources are present becomes perpendicular to the moving direction of the object M to be detected, as shown in FIG. 32, it becomes possible to detect the object M to be detected without erroneous operation even in a state in which the overall projected beam is not completely applied to the object M to be detected.

Figure 33:
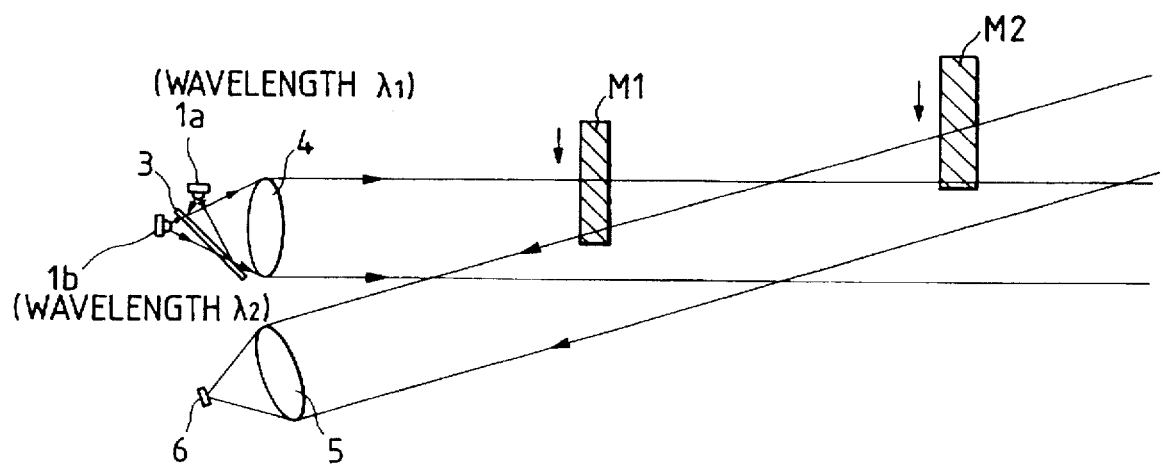
FIG. 33 is a diagram explaining a difference in the detecting position due to the distance to the object to be detected.

In the above-described optical system, the respective optical axes from two or more light sources to the optical element, the optical axis from the projecting section to the object to be detected, and the optical axis from the object to be detected to the light-receiving section are located in the same plane, so as to detect the object to be detected which moves perpendicular to the direction of the projected beam. That is, the sensor is arranged such that the plane where the three optical axes are present is perpendicular to the moving direction of the object to be detected. The fields of view of the projected beam and the light-receiving section in this case are shown in FIG. 33. If it is assumed that the objects to be detected are moving in the plane where the three optical axes are present, as indicated by the arrows in the drawing unlike in the aforementioned moving direction, objects M1 and M2 to be detected are detected at different positions with respect to the moving direction as shown in the drawing owing to the distance between the objects M1 and M2 to be detected, which is inconvenient. In contrast, in a case where the objects to be detected are moving perpendicular to the plane where the three optical axes are present (i.e., in a direction perpendicular to the plane of the drawing) as in this embodiment, the detecting position does not change due to the distance between the objects to be detected. Hence, by virtue of the above-described optical system, stable detection can be achieved for uses such as the positioning of objects to be detected.

Figure 34:
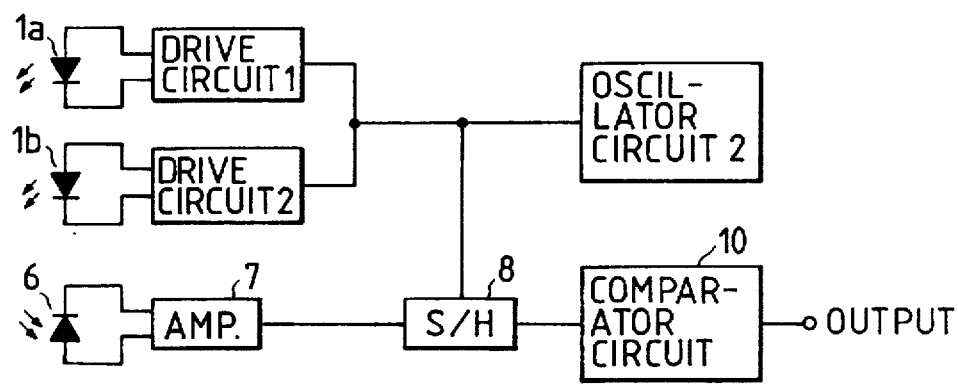
FIG. 34 is a circuit diagram of a signal processing circuit in a further embodiment.

A description will be given of another example in which the present invention is implemented as the reflection-type photoelectric sensor. The configuration of the optical system is the same as that of the above-described embodiment, and a light source emitting red light is used as the light source 1a and a light source emitting infrared light is used as the light source 1b. As for the signal processing circuit, as shown in FIG. 34, the two light sources 1a and 1b are made to emit light simultaneously, the output signal from the light-receiving element 6 is amplified, the signal is subjected to sample and hold (S/H) at the emission timing, and a comparison is made by the comparator circuit 10 to determine whether the value is greater or smaller than a threshold value, so as to detect the presence or absence of the object to be detected. In the case of the conventional sensor using only infrared light, since the projected beam cannot be seen, it is difficult to adjust the optical axes when the apparatus is installed. In addition, although these are sensors in which visible red light is used as the projected beam to facilitate the adjustment of optical axes, the red light has a low reflectance with respect to a green or blue object to be detected, so that there has been a problem in that detection is unstable. Accordingly, by using infrared light and red light for the light sources as in this embodiment, it is possible to overcome the conventional problems.

Figure 35:
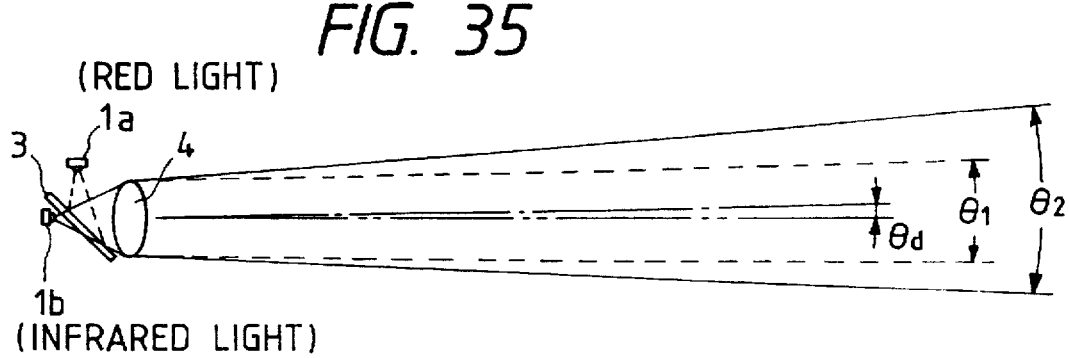
FIG. 35 is a diagram illustrating the relationship of two projected beams.

In addition, as shown in FIG. 31, variations occur in the optical axes and angles of divergence of the two projected beams having different wavelengths in fabrication due to such as the outer configurations of the light-emitting elements constituting the light sources 1a and 1b and the positional offset of their chips, the relative positional offset of the light-projecting lens 4 and the two light-emitting elements, and the angular deviation of the dichroic mirror 3. Therefore, as shown in FIG. 35, the angles of divergence of the two projected beams are designed so that the red projected beam is included in the infrared projected beam. Namely, the sensor is designed such that the formula (θ2/2)>(θ1/2)+θd is satisfied where the angle of divergence of the red projected beam is θ1, the angle of divergence of the infrared projected beam is θ2, and the angular deviation between the optical axes of the red light and the infrared light is θd. Specifically, the optical path length from the light source 1b to the light-projecting lens 4 is made shorter than the optical path length from the light source 1a to the light-projecting lens 4, so as to make the angle of divergence of the infrared projected beam larger than that of the red projected beam. Hence, if the optical axes are adjusted by using the visible red projected beam as a reference during the installation of the sensor, objects to be detected can be detected on a stable basis.

Figure 36:
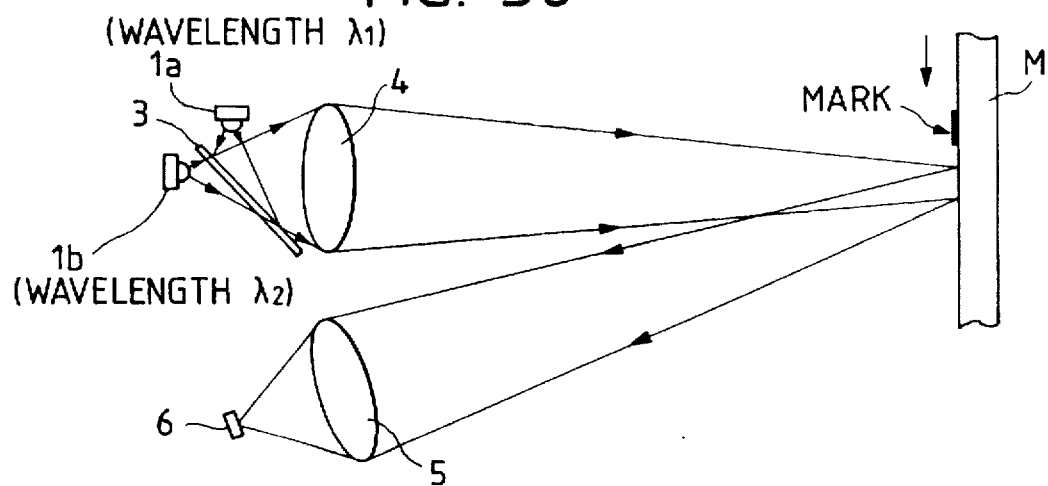
FIG. 36 is a diagram illustrating an optical system of a mark sensor in accordance with a further embodiment of the present invention.

An example in which the present invention is implemented as a mark sensor is shown in FIG. 36. The light-projecting section is so arranged that it has the light sources 1a and 1b for emitting light with the wavelengths λ1 and λ2, respectively, the light from the light source 1a is reflected by the dichroic mirror 3 in the divergent optical path, and the light from the light source 1b is transmitted therethrough to synthesize the light from the two light sources, allowing the light to be projected onto the object M to be detected by means of the light-projecting lens 4. Meanwhile, the light-receiving section is so arranged that the light reflected from the object M to be detected is received by the light-receiving element 6 via the light-receiving lens 5. The light sources 1a and 1b are made to emit light alternately in a time-sharing manner, the amounts of reflected light having the respective wavelengths are detected from the output signal from the light-receiving element 6 in synchronism with the emission of light from the light sources 1a and 1b by using a processing circuit such the one shown in FIG. 37, a ratio therebetween is calculated by the divider circuit 9, and the calculated result is compared with a threshold value by the comparator circuit 10, so as to detect a mark on the object M to be detected.

According to the mark sensor apparatus using two wavelengths in accordance with this embodiment, as compared with a mark sensor using one wavelength, detection is possible if the color of the object to be detected has a reflectance different from that of a substrate concerning either one of the two beams of light having different wavelengths, so that the number of kinds of detectable marks increases. In addition, in cases where the colors of the substrate and the mark of the object to be detected are a combination of black and white, the ratios of the reflected-light signals of the two wavelengths for the substrate and the mark become substantially the same, but by determining the sum of the amounts of the two reflected beams by using an adder circuit 11, it is possible to detect the mark.

Figure 38:
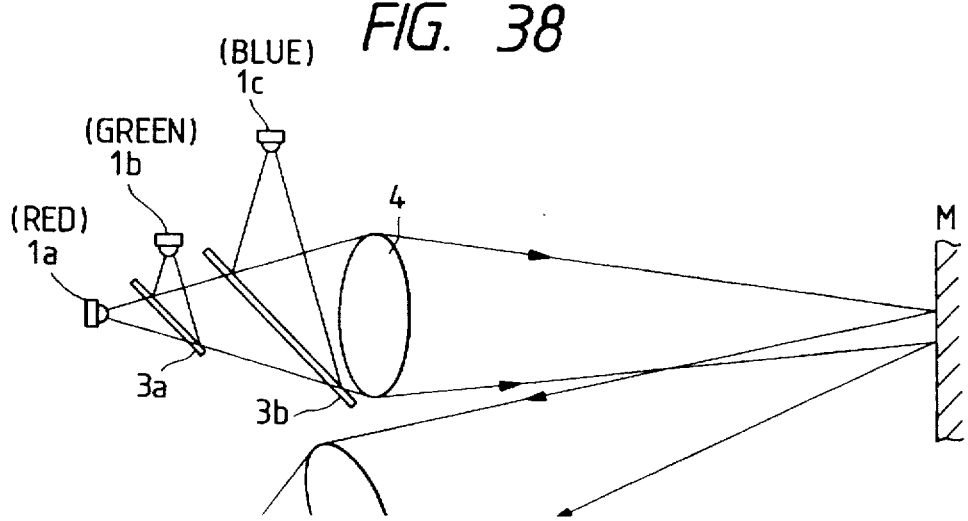
Figure 39:
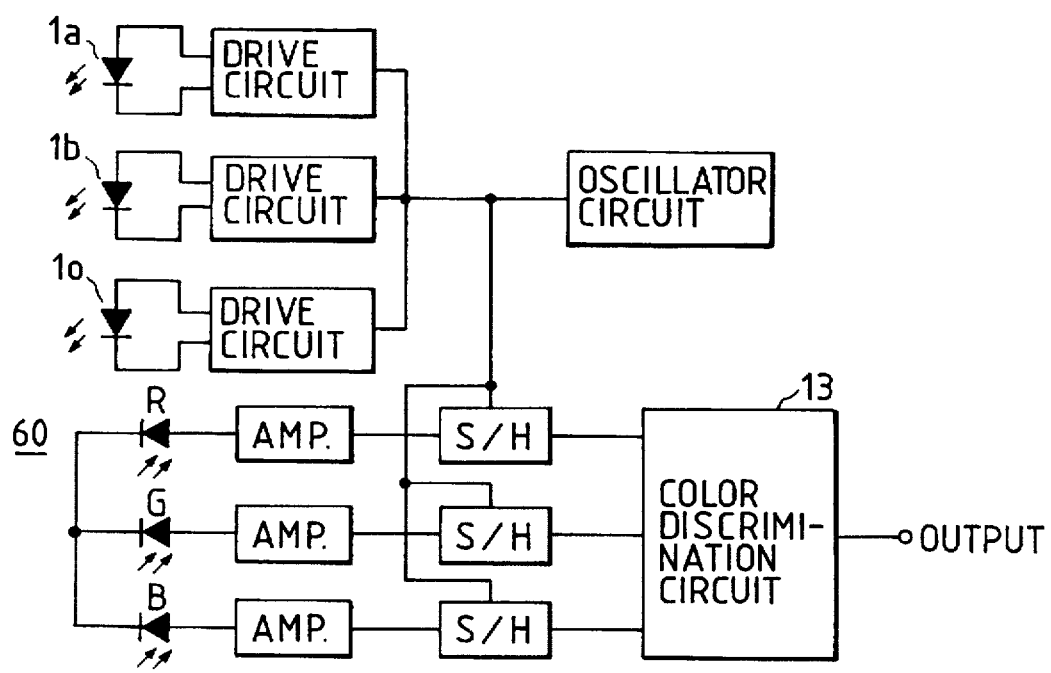
FIG. 39 is a circuit diagram of a signal processing circuit of the color discriminating apparatus.

An example in which the present invention is implemented as a color discriminating apparatus is shown in FIG. 38. The light-projecting section is arranged such that it has light sources 1a, 1b, and 1c for emitting red, green, and blue light, respectively, the light from the light source 1a is transmitted through a dichroic mirror 3a in the divergent optical path, the light from the light source 1b is reflected thereby so as to synthesize the two beams, the synthesized light is transmitted through a dichroic mirror 3b, and the light from the light source 1c is reflected thereby to synthesize the light, so as to project the light onto the object M to be detected by means of the light-projecting lens 4. Meanwhile, the light-receiving section is arranged such that the light reflected from the object M to be detected is received via the light-receiving lens 5 by a color sensor 60 having sensitivity to red light, green light, and blue light, respectively. The signal processing circuit of this color discriminating apparatus is shown in FIG. 39. The amounts of received light having respective wavelengths are detected from the output of the color sensor 60 in synchronism with the emission timing, and the color of the object M to be detected is discriminated by a color discriminating circuit 13.

Figure 37:
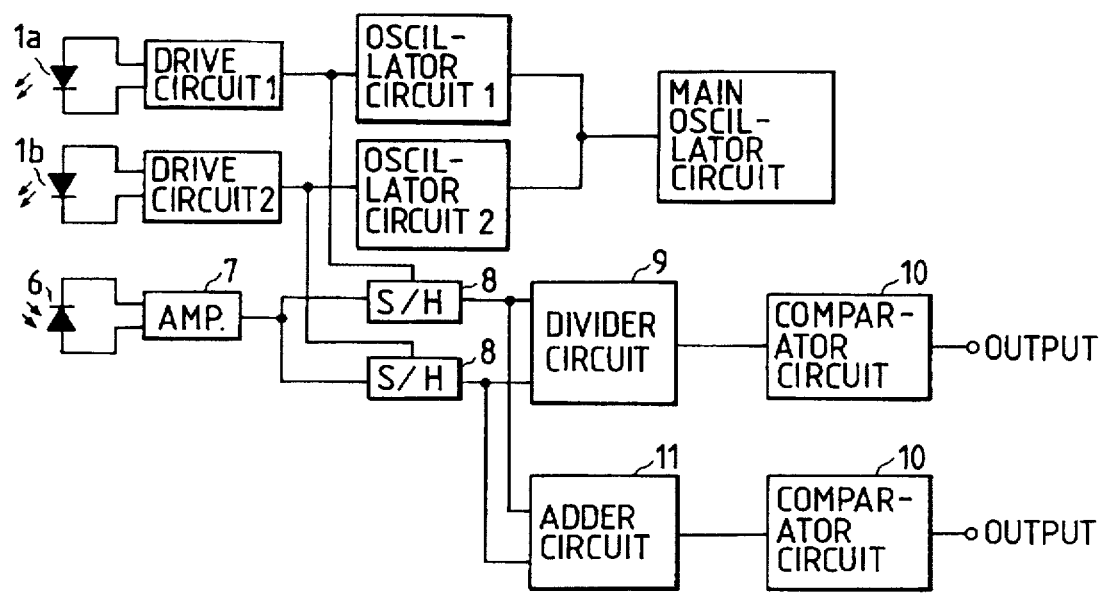
FIG. 37 is a circuit diagram of a signal processing circuit of the mark sensor.
Figure 40:
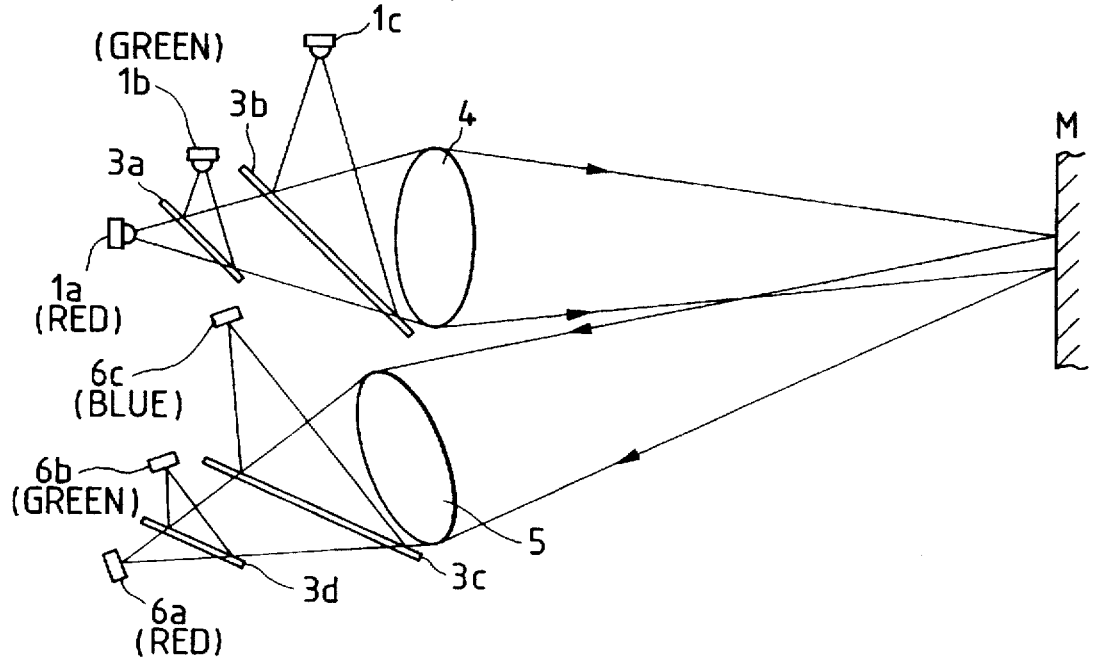
FIG. 40 is a diagram illustrating another example of the color discriminating apparatus.

FIG. 40 shows another embodiment of the color discriminating apparatus. In this example, by using two dichroic mirrors 3c and 3d for the light-receiving section in the same way as the light-projecting section, the reflected light having three wavelengths, red, green, and blue, is separated, and the light with the respective wavelengths is received by light-receiving elements 6a, 6b, and 6c. In addition to this example, an arrangement may be provided such that, as shown in FIGS. 36 and 37, three light sources are made to emit light in a time-sharing manner, the light is received by a single light-receiving element in the light-receiving section, and the amounts of reflected light having the respective wavelengths are detected in synchronism with the emission timing of the respective light sources.

Figure 41:
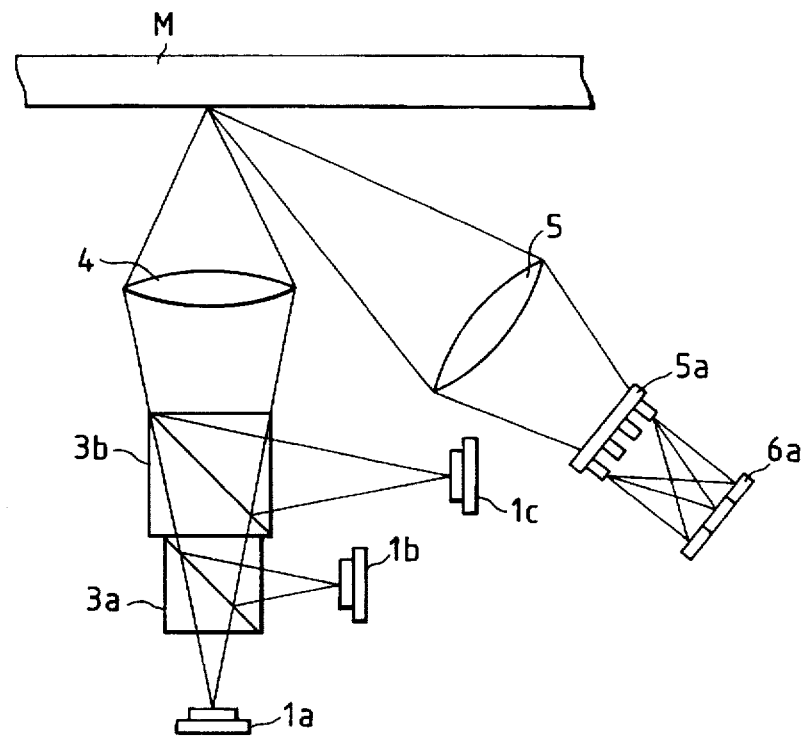
FIG. 41 is a diagram illustrating a color discriminating sensor in accordance with a further embodiment.

FIG. 41 shows an example in which the present invention is applied to a color discriminating sensor. In this example, a red light source is used as the light-emitting element 1a, a green light source is used as the light-emitting element 1b, and a blue light source is used as the light-emitting element 1c. The output light from the light-emitting element 1a and the light-emitting element 1b is synthesized by the dichroic mirror 3a, and the synthesized light and the light emitted from the light-emitting element 1c are synthesized by the dichroic mirror 3b. The synthesized light is focused by the lens 4 onto the object M, and the light reflected from the object M is focused by means of the lens 5, is diffracted by a diffraction grating 5a, and is detected by a light-receiving-element array 6a. If such an arrangement is adopted, the color of the object can be discriminated on the basis of the difference in intensity between the wavelengths of the reflected light or a ratio of intensity therebetween. Since the diffraction grating 5a exhibits a different angle of diffraction depending on the wavelength, so that the diffraction grating 5a is capable of receiving the light by separating the light for each wavelength. As for the dichroic mirrors 3a and 3b, apart from the plate-shaped ones shown in the drawing, it is possible to use cube-shaped or prism-shaped ones.

Figure 42:
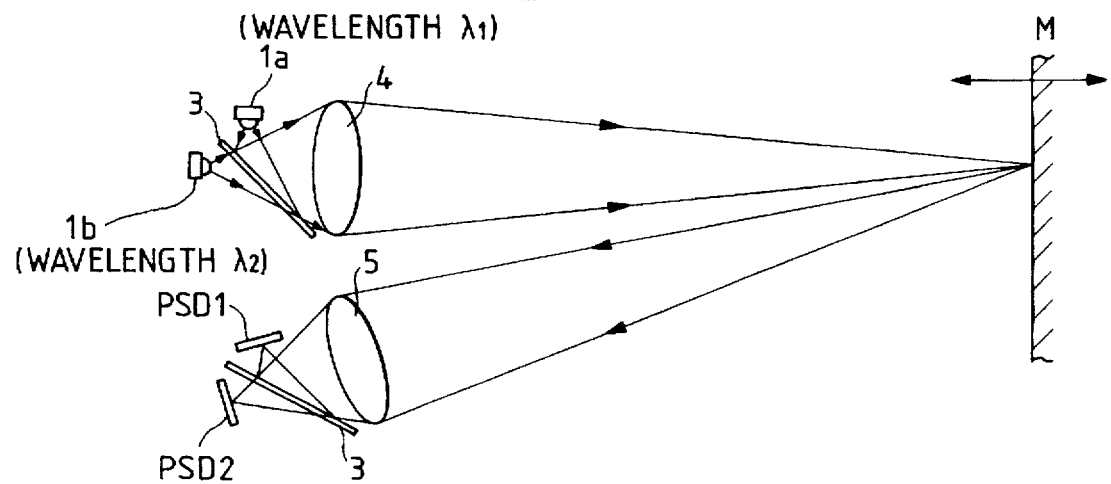
FIG. 42 a diagram illustrating an optical system of a distance measuring sensor in accordance with a further embodiment.

FIG. 42 shows an example in which the present invention is carried out as a distance measuring sensor. The light-projecting section is so arranged that it has the light sources 1a and 1b for emitting light with the wavelengths λ1 and μ2, respectively, the light from the light source 1a is reflected in the divergent optical path by means of the dichroic mirror 3, the light from the light source 1b is transmitted therethrough so as to be synthesized, and the light is projected onto the object M to be detected by means of the light-projecting lens 4. Meanwhile, the light-receiving section is so arranged that the light reflected from the object M to be detected is separated into two wavelengths by the dichroic mirror 3 similar to the light-projecting section via the light-receiving lens 5, and is received by position-detecting elements PSD1 and PSD2, respectively. As for the method of distance measurement, the positions of spots on the position-detecting elements PSD1 and PSD2, which correspond to the distance to the object M to be detected, are detected by the trigonometrical distance measurement method, so as to detect the distance to the object M to be detected.

Figure 43:
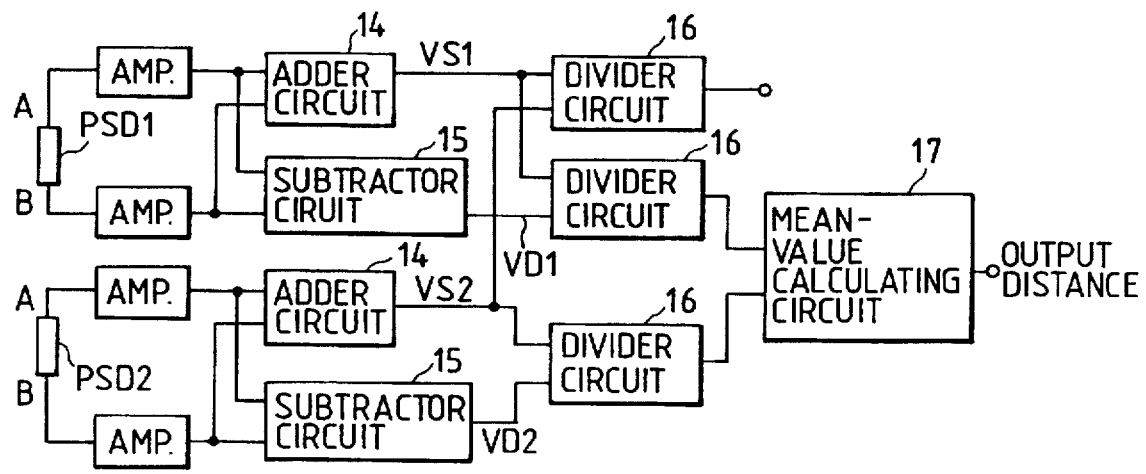
FIG. 43 is a circuit diagram of a signal processing circuit of the distance measuring sensor.

The signal processing circuit of the distance measuring sensor is shown in FIG. 43. This circuit is comprised of adder circuits 14, subtracter circuits 15, divider circuits 16, a mean-value calculating circuit 17, and the like, and is capable of detecting a color in addition to distance measurement. The color detection is effected by a ratio VS1/VS2 between the sum VS1 of two outputs of the position-detecting element PSD1 and the sum VS2 of two outputs of the position-detecting element PSD2. Meanwhile, the distance measurement is effected by an average of VS1/VD1 which is the sum/difference of the two outputs of the position-detecting element PSD1 and VS2/VD2 which is the sum/difference of the two outputs of the position-detecting element PSD2. In addition, although the position-detecting elements are used as the light-receiving elements, the present invention can be realized by using light-receiving elements split into two or more.

Figures 44A, 44B:
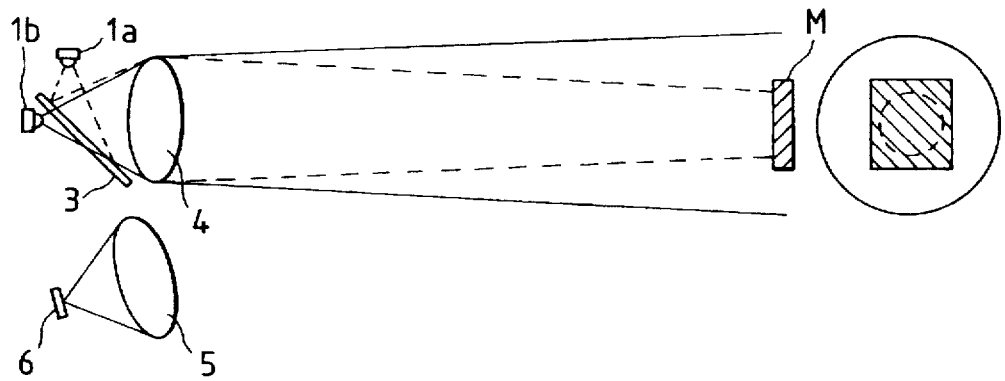
FIG. 44A is a diagram illustrating an optical system of a simple-shape recognizing apparatus in accordance with an embodiment of the present invention.
FIG. 44B is a diagram illustrating spots thereof.

An example in which the present invention is implemented as a simple-shape recognizing sensor is shown in FIG. 44. The light-projecting section is so arranged that it has the light sources 1a and 1b for emitting light with the wavelengths λ1 and λ2, respectively, the light from the light source 1a is reflected in the divergent optical path by means of the dichroic mirror 3, the light from the light source 1b is transmitted therethrough so as to be synthesized, and the light is projected onto the object M to be detected by means of the light-projecting lens 4. In terms of the relationship between the two projected beams, the two projected beams are concentric with one angle of divergence being smaller than the other. Since a light sources having a shorter wavelength generally has smaller maximum emission power, the light source having the shorter wavelength of the two beams having different wavelengths is desirably provided with a smaller angle of divergence. Meanwhile, the light-receiving section is so arranged that the light reflected from the object M to be detected is received by the light-receiving element 6 via the light-receiving lens 5.

Figure 45:
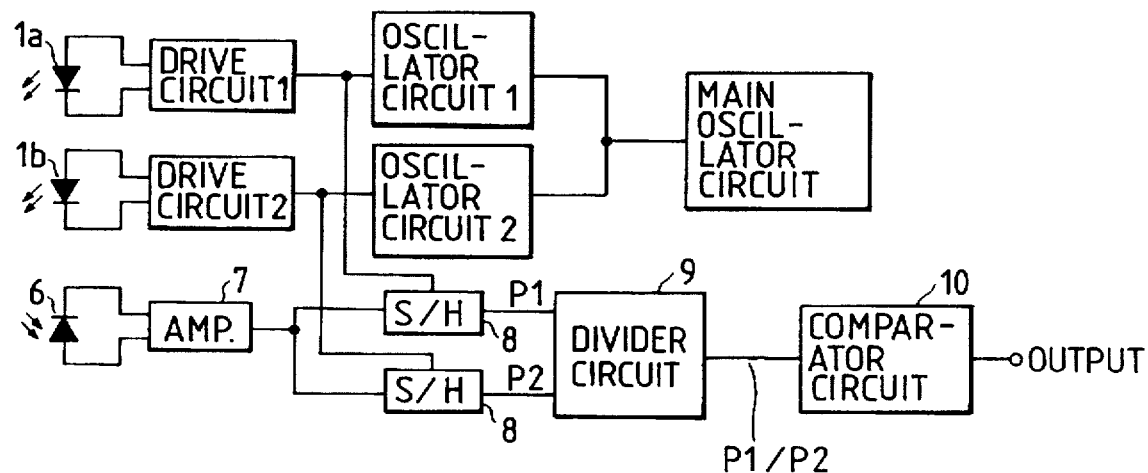
FIG. 45 is a circuit diagram of a signal processing circuit of the simple-shape recognizing apparatus.
Figure 46:
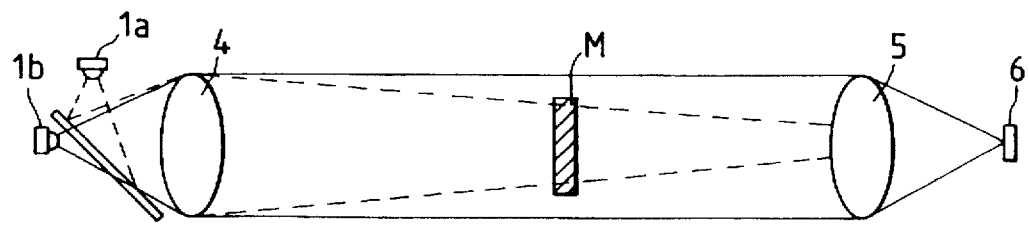
FIG. 46 is a diagram illustrating an optical system of a transmission-type simple-shape recognizing apparatus.

The signal processing circuit of this shape-recognizing sensor is shown in FIG. 45. The two light sources 1a and 1b are made to emit light alternately in a time-sharing manner, and after the output signal from the light-receiving element 6 is amplified by the amplifier 7, the amounts of reflected light with the respective wavelengths are detected in synchronism with the emission of the light from the light sources, and a ratio between the two amounts of reflected light is determined by the divider circuit 9. If it is assumed that the amount of reflected light with a wavelength having a greater angle of divergence is P1, that the amount of reflected light with a wavelength having a smaller angle of divergence is P2, and that the overall powers of the two projected beams are equal, if the object M to be detected has a size greater than the projected beam having a greater angle of divergence, P1/P2 becomes virtually 1, and if the object M to be detected has a size falling between the projected beam having the greater angle of divergence and the projected beam having the smaller angle of divergence, the smaller the object M to be detected, the smaller P1/P2 becomes. Accordingly, it is possible to detect the size of the object M to be detected through the ratio P1/P2.

Figure 47A:
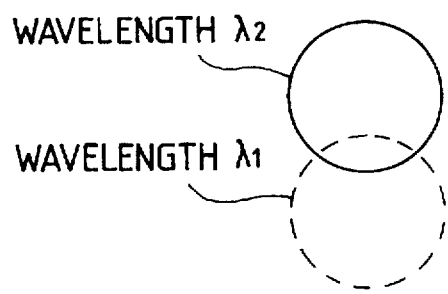
FIG. 47A is a diagram illustrating the relationship of spots in a case where two beams are offset from each other when the spots overlap with each other.
Figure 47B:
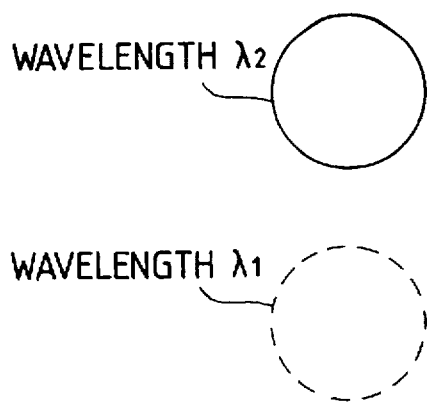
FIG. 47B is a diagram illustrating the relationship of spots in a case where two beams are offset from each other when there are not overlapping portions in the spots.

Although in the above-described embodiments, a reflection-type sensor has been shown, the present invention is not limited to the same, and can be similarly applied to a transmission-type sensor for receiving the light which was not shielded by the object M to be detected. Furthermore, in either the reflection-type or the transmission-type sensor, if an arrangement is provided such that, as shown in FIG. 47, two projected beams having different wavelengths are projected by being offset from each other, in both cases where portions of the spots overlap with each other and cases where there are no overlapping portions, the position of the object to be detected, i.e., the size or shape in the deviating direction of the object to be detected, can be determined by detecting which of the projected spots has a large amount of received light.

Figure 48:
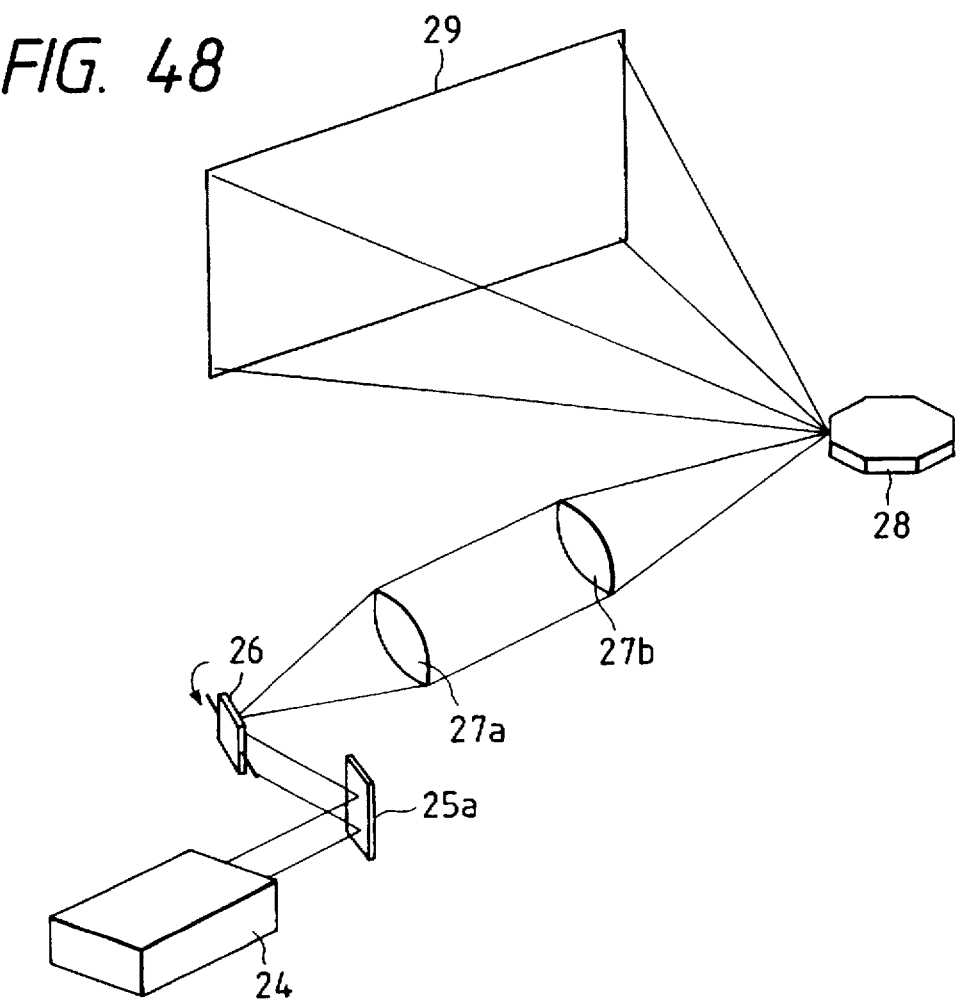
FIG. 48 is a diagram illustrating a laser display in accordance with an embodiment of the present invention.

FIG. 48 shows an example in which the present invention is applied to a laser display. A light source device 24 is provided in which three laser beams of red, green, and blue are synthesized by being subjected to intensity modulation by unillustrated optical modulators by means of tricolor signals of color television. The light sent from the light source device 24 is reflected by a reflecting mirror 25a, and is led to a galvanometer 26. The synthesis of the light can be effected by using, for example, dichroic mirrors. The galvanometer 26 effects scanning in the vertical direction, while a rotating polygonal mirror 28 effects scanning in the horizontal direction. In addition, two relay lenses 27a and 27b are used for improving the frequency response by making optical deflectors small, the deflectors are located at the respective focal points, and the two lenses are arranged such that the distance therebetween becomes the sum of the two focal lengths. If the light scanned by the rotating polygonal mirror 28 is projected onto a screen 29, a display for color television having high resolution and saturation is obtained.

Figure 49:
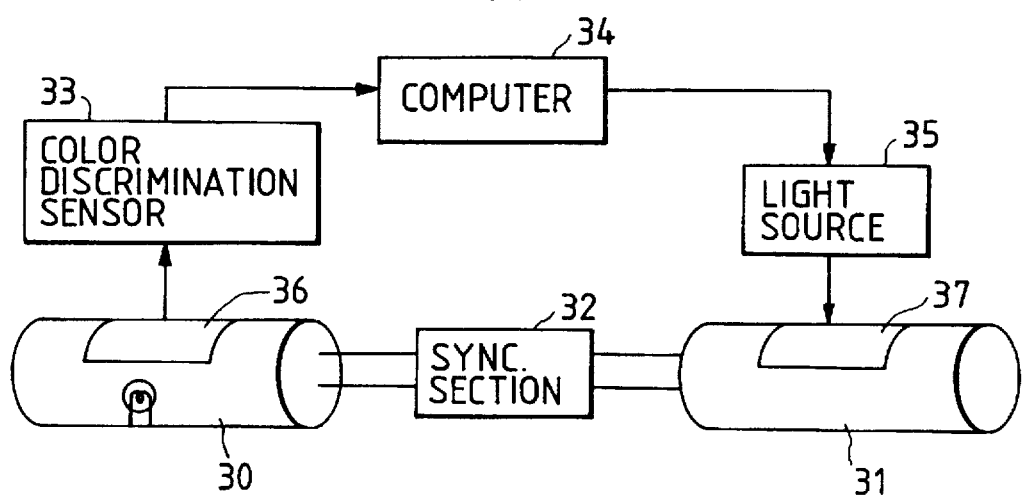
FIG. 49 is a diagram illustrating a color image scanner in accordance with an embodiment of the present invention.

FIG. 49 shows an example in which the present invention is applied to a color image scanner. In this color image scanner, an input scanning unit 30 and an output scanning unit 31 are rotated by being synchronized with each other by a synchronization unit 32. A color original 36 placed on the input scanning unit 30 is scanned by a color discrimination sensor 33 such as the one shown in FIG. 41, and that information is sent to a computer 34. The computer 34 controls a light source 35 on the basis of the scanned result supplied thereto, and records a color image on a recording material 37 in the output scanning unit 31.

Figure 50:
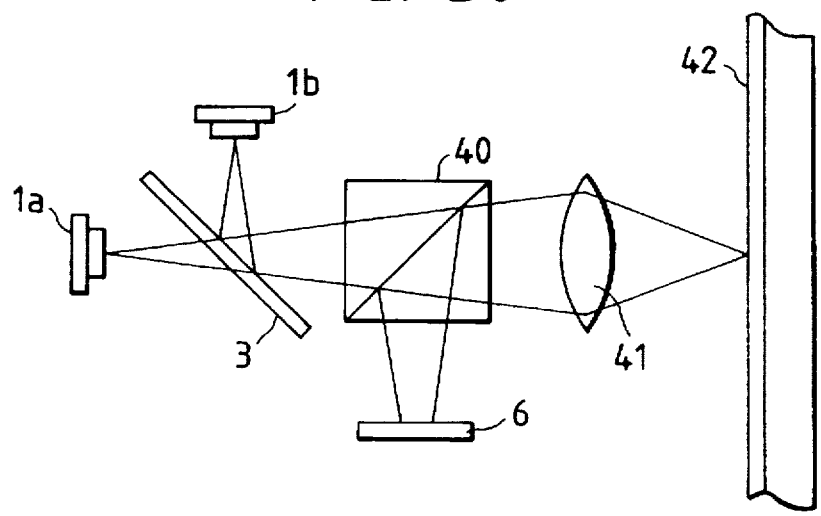
FIG. 50 is a diagram illustrating a two-wavelength optical head in accordance with an embodiment of the present invention.

FIG. 50 shows an example in which the present invention is applied to a two-wavelength optical head. In this example, outputs from the light-emitting elements 1a and 1b for emitting light having different wavelengths are synthesized by the dichroic mirror 3, and the synthesized light is applied to an optical disk 42 via a polarized-beam splitter 40 and a lens 41, so as to effect the direct overwriting and parallel reading of data. In a case where only one light source is used, processing in writing data to the optical disk 42 is delayed since writing needs to be effected by waiting for the disk 42 to rotate after the bits are erased once. In this example, however, since direct overwriting can be effected, high-speed processing can be effected. In reading, on the other hand, since information in two track grooves can be read simultaneously, high-speed reading becomes possible.

[Advantages of the Invention]

As described above, in accordance with the optical apparatus or optical sensor apparatus according to the present invention, the arrangement provided is such that a dichroic mirror which has a multilayered structure for synthesizing or separating light beams with different wavelengths and exhibiting low angle-of-incidence dependence is disposed in divergent or convergent optical paths, i.e., paths of nonparallel rays of light, and the light is reflected or transmitted in accordance with the wavelength, so as to synthesize or separate the light beams. Accordingly, as compared with the conventional case where the optical elements are disposed in the paths of parallel rays of light, it is possible to make the apparatus compact, reduce the number of component parts used, and lower the cost. In other words, in the configuration of the conventional dichroic mirror, if the angle of incidence changes in the paths of nonparallel rays of light, cases can occur in which the light with the wavelength to be reflected is transmitted without being reflected, with the result that the conventional dichroic mirror could be used only in the paths of parallel rays of light. In contrast, in the present invention, since the angle-of-incidence dependence is made low, the dichroic mirror can be used in the paths of nonparallel rays of light, so that the above-described advantage can be obtained.

In addition, in accordance with the dichroic mirror according to the present invention, a material layer having a small difference in the refractive index is selected as a repeatedly laminated portion, while, in layers other than the repeated layer, a material layer having a large difference in the refractive index is selected as an adjustment layer for adjusting ripples occurring in the transmittance characteristic. Since these layers are combined, it is possible to obtain a steep spectral characteristic and a wide nontransmitting-band characteristic. Accordingly, it is possible to reliably synthesize or separate two light beams having close wavelengths.

Further, in accordance with the optical apparatus according to the present invention, the arrangement provided is such that the light from two light sources having different wavelengths is synthesized by a dichroic mirror in the divergent optical paths, and is projected onto an object to be detected by means of a light-projecting lens, or the light is separated by a dichroic mirror in the convergent paths of two light beams having different wavelengths. Therefore, as compared with a conventional apparatus, one light-projecting lens can be shared instead of using two light-projecting lenses, and the optical members can be made compact, making the overall projecting optical system compact. Hence, it is possible to realize a low-cost and compact apparatus.

Furthermore, by using the dichroic mirror having the optical multilayered film structure of the present invention, the light from one light source is reflected, while the other light is transmitted. Since the reflected light is not transmitted through the substrate of the optical member, a beam which is free of aberrations can be projected onto the object to be detected, and it is possible to effect the detection of an object on a stable basis. Hence, an error does not occur in the detection of the position of the object to be detected, and the apparatus of the invention can be used as a reflection-type sensor and a transmission-type sensor. Moreover, it is possible to effect the discrimination of a color in addition to the detection of the shape and the presence or absence of the object to be detected and the distance to the object to be detected.

What is claimed is:

1. A dichroic mirror comprising:

a first portion comprising a plurality of subportions, each subportion comprising a layer of a first material and a layer of a second material, said first and second materials having a first difference in a refractive index, each of said layers of said first material in said plurality of subportions having the same thickness, each of said layers of said second material in said plurality of subportions having the same thickness; and a second portion comprising a layer of a third material and a layer of a fourth material, said second portion being an adjustment layer, said third and fourth materials having a second difference in a refractive index, said second difference being greater than said first difference;

wherein said second portion is alternation of said layer of said third material and said layer of said fourth material, and an optical thickness of any one of said layers of said third material is different from that of other said layer of said third material, and an optical thickness of anyone of said layers of said fourth material is different from that of other said layer of said fourth material.

2. A dichroic mirror according to claim 1, wherein one of said first and second materials and one of said third and fourth materials are of a same material.

3. A dichroic mirror according to claim 1, further comprising a third portion comprising a plurality of second subportions, each second subportion comprising a layer of a fifth material and a layer of a sixth material, said fifth and sixth materials having the first difference in a refractive index, each of said layers of said fifth material in said second subportions having the same thickness, each of said layers of said sixth material in said second subportions having the same thickness;

wherein the thickness of said layers of fifth and sixth materials are different from that of said layers of first and second materials.

4. A dichroic mirror according to claim 1, further comprising a fourth portion comprising a plurality of third subportions, each third subportion comprising a layer of a seventh material and a layer of an eighth material, said seventh and eighth materials having a third difference in a refractive index, each of said layers of said seventh material in said third subportions having the same thickness, each of said layers of said eighth material in said third subportions having the same thickness;

wherein said third difference is greater than said first difference.

5. A dichroic mirror according to claim 1, wherein said first and third material are comprised of $TiO_2$, said second material is comprised of $Al_2O_3$, and said fourth material is comprised of $SiO_2$.

6. An apparatus for detecting an object to be detected comprising:

emitting means for emitting a first light beam and a second light beam whose wavelength are different from each other, at least one of said first and second light beam being at least one of a divergent light beam and a convergent light beam;

a dichroic mirror, said first and second light beams being incident on different surfaces of said dichroic mirror, for transmitting one of said first and second light beams therethrough and reflecting the other of said first and second light beams thereby to synthesize said first and second beams so that the synthesized first and second light beams are projected toward the object to be detected; and detecting means for receiving said first and second light beams reflected by the object to be detected, and detecting the object to be detected on the basis of amounts of the first light beams and the second light beam received;

wherein said dichroic mirror comprises an optical multi-layered film, and a characteristic of said dichroic mirror satisfy at least one of relations of:

$\lambda D > (\lambda 1 + \lambda 2)/2$, $\lambda D > \sqrt{(\lambda 1 \times \lambda 2)}$, and $X = \cos^{-1}[(2\cos a - 1) \cos \theta]$, where wavelength of said first and second light beams are $\lambda 1$ and $\lambda 2$, respectively;

a wavelength in which a transmittance at a central angle of said dichroic mirror disposed in at least one of divergent and convergent optical paths becomes ½ of a maximum transmittance thereof is $\lambda D$;.

an incident angle of at least one of said divergent and convergent light beams on said dichroic mirror is in the range of $\theta \pm a$; and an angle in which a transmittance with respect to a wavelength of at least one of $(\lambda 1 + \lambda 2)/2$ and $\sqrt{(\lambda 1 \times \lambda 2)}$ becomes ½ of the maximum transmittance is x.

7. An apparatus for detecting an object to be detected, comprising:

projecting means for projecting a first light beam and a second light beam whose wavelengths are different from each other toward the object to be detected;

a dichroic mirror, said first and second light beam being at least one of the divergent light beam and convergent light beams being made incident on a surface of a dichroic mirror to transmit one of said first and second light beams through said dichroic mirror and reflecting the other of said first and second light beams by said dichroic mirror to separate said light beam reflected by the object to be detected into said first and second beams; and detecting means for receiving said separated first and second beams, respectively and detecting the object to be detected on the basis of a difference between amounts of the first light beam and the second light beam received;

wherein said dichroic mirror comprises an optical multi-layered film, and a characteristic of said dichroic mirror satisfy at least one of relations of:

$\lambda D > (\lambda 1 + \lambda 2)/2$, $\lambda D > \sqrt{(\lambda 1 \times \lambda 2)}$, and $X = \cos^{-1}[(2\cos a - 1) \cos \theta]$, where wavelengths of said first and second light beams are $\lambda 1$ and $\lambda 2$, respectively;

a wavelength in which a transmittance at a central angle of said dichroic mirror disposed in at least one of divergent and convergent optical paths becomes ½ of a maximum transmittance thereof is $\lambda D$;

an incident angle of at least one of said divergent and convergent light beams on said dichroic mirror is in the range of $\theta \pm a$; and an angle in which a transmittance with respect to a wavelength of at least one of $(\lambda 1 + \lambda 2)/2$ and $\sqrt{(\lambda 1 \times \lambda 2)}$ becomes ½ of the maximum transmittance is X.

8. An apparatus for detecting an object to be detected, comprising:

projecting means for projecting a first light beam and a second light beam whose wavelengths are different from each other, at least one of said first and second light beams being one of a divergent light beam and a convergent light beam;

a dichroic mirror for making said first and second light beams incident on different surfaces thereof, said dichroic mirror transmitting one of said first and second light beams therethrough and reflecting the other of said first and second light beams thereby to synthesize said first and second beams to project said synthesized first and second light beams toward the object to be detected; and detecting means for receiving said first and second light beams reflected by the object to be detected, and detecting the object to be detected on the basis of amounts of the first light beam and the second light beam received;

wherein said dichroic mirror comprises:

a first portion comprising a plurality of subportions, each subportion including a layer of a first material having a first refractive index, and a layer of a second material having a second refractive index lower than said first refractive index, and a second portion including a layer of said first material and a layer of a third material having a third refractive index lower than said second refractive index.

9. An apparatus for detecting an object to be detected, comprising:

projecting means for projecting a first light beam and a second light beam whose wavelength are different from each other, at least one of said first and second light beams being one of a divergent light beam and a convergent light beam;

a dichroic mirror for making said first and second light beams incident on different surfaces thereof, said dichroic mirror transmitting one of said first and second light beams therethrough and reflecting the other of said first and second light beams thereby to synthesize said first and second beams to project said synthesized first and second light beams toward the object to be detected; and detecting means for receiving said first and second light beams reflected by the object to be detected, and detecting the object to be detected on the basis of amounts of the first light beam and the second light beam received;

wherein said dichroic mirror comprises;

a first portion comprising a plurality of subportions, each subportion including a layer of a first material layer and a layer of a second material which have a first difference in a refractive index, each of said layers of said first material having the same optical thickness, each of said layers of said second material having the same optical thickness; and a second portion comprising a layer of a third material and a layer of a fourth material which have a second difference in a refractive index, said second difference being greater than said first difference.

10. An apparatus for detecting an object to be detected, comprising:

projecting means for projecting a first light beam and a second light beam whose wavelengths are different from each other toward the object to be detected;

a dichroic mirror for making said first and second light beam, which are at least one of a divergent light beam and convergent light beams to be detected, incident on a surface of a dichroic mirror to transmit one of said first and second light beams through said dichroic mirror and reflecting the other of said first and second light beams by said dichroic mirror to separate said light beam reflected by the object to be detected into said first and second beams; and detecting means for receiving said separated first and second beams, respectively, and detecting the object to be detected on the basis of amounts of the first light beam and the second light beam received;

wherein said dichroic mirror comprises:

a first portion comprising a plurality of subportions, each subportion including a layer of a first material having a first refractive index, and a layer of a second material having a second refractive index; and a second portion comprising a layer of a first material having a first refractive index and a layer of a third material having a third refractive index.

11. An apparatus for detecting an object to be detected, comprising:

projecting means for projecting a first light beam and a second light beam whose wavelengths are different from each other toward the object to be detected;

a dichroic mirror for making said first and second light beams, which are at least one of a divergent light beam and convergent light beams to be detected, incident on a surface of a dichroic mirror to transmit one of said first and second light beams through said dichroic mirror and reflecting the other of said first and second light beams by said dichroic mirror to separate said light beam reflected by the object to be detected into said first and second beams; and detecting means for receiving said separated first and second beams, respectively, and detecting the object to be detected on the basis of amounts of the first light beam and the second light beam received;

wherein said dichroic mirror comprises:

a first portion comprising a plurality of subportions, each subportion including a layer of a first material and a layer of a second material which have a first difference in a refractive index, each of said layers of said first material having the same optical thickness, each of said layers of said second material having the same optical thickness;

a second portion comprising a layer of a third material and a layer of a fourth material which have a second difference in a refractive index, said second difference being greater than said first difference.

12. A color discriminating apparatus comprising:

projecting means for projecting a first light beam and a second light beam whose wavelength are different from each other, at least one of said first and second light beams being at least one of a divergent light beam and a convergent light beam;

a dichroic mirror, said first and second light beams are incident on different surface of said dichroic mirror, for transmitting one of said first and second light beams therethrough and reflecting the other of said first and second light beams thereby to synthesize said first and second beams so that the synthesized first and second light beams are projected toward the object to be detected;

detecting means for receiving said first and second light beams reflected by the object to be detected, and detecting the object to be detected on the basis of amounts of the first light beams and the second light beam received; and discriminating means for discriminating a color of the object to be detected on the basis of the signal detected by said detecting means;

wherein said dichroic mirror comprises an optical multi-layered film, and a characteristic of said dichroic mirror satisfies at least one of relations of:

$\lambda D > (\lambda 1 + \lambda 2)/2$, $\lambda D > \sqrt{(\lambda 1 \times \lambda 2)}$, and $X = \cos^{-1}[(\cos a - 1)\cos \theta]$, where wavelength of said first and second light beams are $\lambda 1$ and $\lambda 2$, respectively;

a wavelength in which a transmittance at a central angle of said dichroic mirror disposed in at least one of divergent and convergent optical paths becomes ½ of a maximum transmittance thereof is $\lambda D$;

an incident angle of at least one of said divergent and convergent light beams on said dichroic mirror is centered at $\theta$ and spans a range of a on either side of center angle $\theta$; and an angle in which a transmittance with respect to a wavelength of at least one of $(\lambda 1 + \lambda 2)/2$ and $\sqrt{(\lambda 1 \times \lambda 2)}$ becomes ½ of the maximum transmittance is x.

13. A color discriminating apparatus comprising:

projecting means for projecting a first light beam and a second light beam whose wavelength are different from each other, at least one of said first and second light beams being one of a divergent light beam and a convergent light beam;

a dichroic mirror for making said first and second light beams incident on different surfaces thereof, said dichroic mirror transmitting one of said first and second light beams therethrough and reflecting the other of said first and second light beams thereby to synthesize said first and second beams to project said synthesized first and second light beams toward the object to be detected;

detecting means for receiving said first and second light beams reflected by the object to be detected, and detecting the object to be detected on the basis of amounts of the first light beam and the second light beam received; and discriminating means for discriminating a color of the object to be detected on the basis of the signal detected by said detecting means;

wherein said dichroic mirror comprises:

a first portion comprising a plurality of subportions, each subportion including a layer of a first material having a first refractive index, and a layer of a second material having a second refractive index lower than said first refractive index; and a second portion including a layer of said first material and layer of a third material having a third refractive index lower than said second refractive index.

14. A color discriminating apparatus comprising:

projecting means for projecting a first light beam and a second light beam whose wavelength are different from each other, at least one of said first and second light beams being one of a divergent light beam and a convergent light beam;

a dichroic mirror for making said first and second light beams incident on different surfaces thereof, said dichroic mirror transmitting one of said first and second light beams therethrough and reflecting the other of said first and second light beams thereby to synthesize said first and second beams to project said synthesized first and second light beams toward the object to be detected;

detecting means for receiving said first and second light beams reflected by the object to be detected, and detecting the object to be detected on the basis of amounts of the first light beam and the second light beam received; and discriminating means for discriminating a color of the object to be detected on the basis of the signal detected by said detecting means' wherein said dichroic mirror comprises:

a first portion comprising a plurality of subportions, each subportion including a layer of a first material layer and a layer of a second material which have a first difference in a refractive index, each of said layers of said first material having the same optical thickness, each of said layers of said second material having the same optical thickness; and a second portion comprising a layer of a third material and a layer of a fourth material which have a second difference being greater than said first difference.

15. A dichroic mirror for use with first and second light beams having wavelengths $\lambda 1$ and $\lambda 2$ respectively, each of said light beams having an optical path, said mirror comprising:

a first portion comprising a plurality of subportions, each subportion comprising a layer of a first material and a layer of a second material, said first and second materials having a first difference in a refractive index, each of said layers of said first material having the same optical thickness, each of said layers of said second material having the same optical thickness;

a second portion comprising a layer of a third material and a layer of a fourth material, said third and fourth materials having a second difference in a refractive index, said second difference being greater than said first difference;

such that, when said dichroic mirror is positioned in said optical paths and one of said light beams is incident on said dichroic mirror at an angle centered at $\theta$ and spans a range of a on either side of the center angle $\theta$, a characteristic of said dichroic mirror satisfies at least one of the relation of:

$\lambda D > (\lambda 1 + \lambda 2)/2$, $\lambda D > \sqrt{(\lambda 1 \times \lambda 2)}$, and $\chi = \cos^{-1} [(2\cos a - 1)\cos \theta]$, wherein a wavelength in which a transmittance at a central angle of said dichroic mirror disposed in optical paths becomes ½ of a maximum transmittance thereof is $\lambda D$;

wherein an angle in which a transmittance with respect to a wavelength of at least one of $(\lambda 1 + \lambda 2)/2$ and $\sqrt{(\lambda 1 \times \lambda 2)}$ becomes ½ of the maximum transmittance is represented by $\chi$.

16. A dichroic mirror according to claim 15, wherein one of said first and second materials and one of said third and fourth materials are of a same material.

17. A dichroic mirror according to claim 15, further comprising a third portion comprising a plurality of second subportions, each second subportion comprising a layer of a fifth material and a layer of a sixth material, said fifth and sixth materials having a first difference in a refractive index, each of said layers of said fifth material having the same optical thickness, each of said layers of said sixth material having the same optical thickness;

wherein the thickness of said layers of fifth and sixth materials are different from that of said layers of first and second materials.

18. A dichroic mirror according to claim 15, further comprising a fourth portion comprising a plurality of third subportions, each third subportion comprising a layer of a seventh material and a layer of an eighth material, said seventh and eighth having a third difference in a refractive index, said third difference being greater than said first difference, each of said layer of said seventh material having the same thickness, each of said layer of said eighth material having the same thickness;

wherein the thickness of said layers of seventh and eighth materials are different from that of said layers of first and second materials.

19. A dichroic mirror according to claim 15, wherein said first and third materials are comprised to $TiO_2$, said second material is comprised of $Al_2O_3$, and said fourth material is comprised Of $SiO_2$.

20. A method for detecting an object to be detected, comprising the steps of:

emitting a first light beam and a second light beam whose wavelength are different from each other, at least one of said first and second light beams being one of a divergent light beam and a convergent light beam;

making said first and second light beams incident on different surfaces of a dichroic mirror, said dichroic mirror transmitting one of said first and second light beams therethrough and reflecting the other of said first and second light beams thereby to synthesize said first and second beams;

projecting said synthesized first and second light beams toward the object to be detected;

receiving said first and second light beams reflected by the object to be detected; and detecting the object to be detected on the basis of amounts of the first light beam and the second light beam received;

wherein said dichroic mirror comprises:

a first portion comprising a plurality of subportions, each subportion including a layer of a first material and a layer of a second material which have a first difference in a refractive index, each of said layers of said first material having the same optical thickness, each of said layers of said second material having the same optical thickness; and a second portion comprising a layer of a third material and a layer of a fourth material which have a second difference in a refractive index, said second difference being greater than said first difference.

21. A method for detecting an object to be detected, comprising the steps of:

projecting a first light beam and a second light beam whose wavelengths are close to each other toward the object to be detected;

making said first and second light beam, which are at least one of a divergent light beam and convergent light beams incident on a surface of a dichroic mirror;

transmitting one of said first and second light beams through said dichroic mirror and reflecting the other of said first and second light beams by said dichroic mirror to separate said light beam reflected by the object to be detected into said first and second beams;

receiving said separated first and second beams, respectively; and detecting the object to be detected on the basis of amounts of the first light beam and the second light beam received;

wherein said dichroic mirror comprises:

a first portion comprising a plurality of subportions, each subportion including a layer of a first material and a layer of a second material which have a first difference in a refractive index, each of said layers of said first material having the same optical thickness, each of said layers of said second material having the same optical thickness; and a second portion comprising a layer of a third material and a layer of a fourth material which have a second difference in a refractive index, said second difference being greater than said first difference.

* * * * *